US012026156B2

(12) United States Patent
Raghuramu et al.

(10) Patent No.: US 12,026,156 B2
(45) Date of Patent: Jul. 2, 2024

(54) INFORMATION ENHANCED CLASSIFICATION

(71) Applicant: FORESCOUT TECHNOLOGIES, INC., San Jose, CA (US)

(72) Inventors: Arun Raghuramu, Milpitas, CA (US); Yuzhou Song, San Jose, CA (US); Yang Zhang, Fremont, CA (US)

(73) Assignee: Forescout Technologies, Inc., San Jose, CA (US)

( * ) Notice: Subject to any disclaimer, the term of this patent is extended or adjusted under 35 U.S.C. 154(b) by 158 days.

(21) Appl. No.: 16/915,958

(22) Filed: Jun. 29, 2020

(65) Prior Publication Data
US 2021/0406255 A1    Dec. 30, 2021

(51) Int. Cl.
| | | |
|---|---|---|
| *G06F 16/245* | (2019.01) | |
| *G06F 16/28* | (2019.01) | |
| *G06F 16/953* | (2019.01) | |
| *G06N 5/04* | (2023.01) | |
| *G06N 20/00* | (2019.01) | |
| *H04L 43/08* | (2022.01) | |

(52) U.S. Cl.
CPC .......... *G06F 16/245* (2019.01); *G06F 16/285* (2019.01); *G06F 16/953* (2019.01); *G06N 5/04* (2013.01); *G06N 20/00* (2019.01); *H04L 43/08* (2013.01)

(58) Field of Classification Search
CPC .... G06F 16/245; G06F 16/285; G06F 16/953; H04L 43/08
See application file for complete search history.

(56) References Cited

U.S. PATENT DOCUMENTS

| | | | |
|---|---|---|---|
| 8,984,149 B1 * | 3/2015 | Martini | H04L 43/08 709/228 |
| 10,999,146 B1 * | 5/2021 | Savalle | G06F 16/353 |

(Continued)

FOREIGN PATENT DOCUMENTS

EP      3065076 A1    9/2016

OTHER PUBLICATIONS

Feng, Xuan, et al., "Acquisitional Rule-based Engine for Discovering Internet-of-Thing Devices," Proceedings of the 27th USENIX Security Symposium, Aug. 15-17, 2018, pp. 327-341.*

(Continued)

*Primary Examiner* — Pierre M Vital
*Assistant Examiner* — Jedidiah P Ferrer
(74) *Attorney, Agent, or Firm* — Womble Bond Dickinson (US) LLP

(57) ABSTRACT

Systems, methods, and related technologies for classification are described. Network traffic from a network may be accessed and an entity may be selected. One or more values associated with one or more properties associated with the entity may be determined. The one or more values may be accessed from the network traffic. A search query based on the one or more values associated with the one or more properties associated with the entity is determined and performed. A search query result is received and the search query result comprises a plurality of webpages. Data from a webpage of the plurality of webpages is accessed. A classification result of the entity is determined, by a processing device, based on the data from the webpage of the plurality of webpages. The classification result is stored.

18 Claims, 12 Drawing Sheets

(56) References Cited

U.S. PATENT DOCUMENTS

| | | | |
|---|---|---|---|
| 2011/0252017 A1* | 10/2011 | Westphal | G06F 16/3338 707/706 |
| 2017/0262523 A1* | 9/2017 | Epstein | G06F 16/285 |
| 2018/0270229 A1 | 9/2018 | Zhang et al. | |
| 2019/0294642 A1 | 9/2019 | Matlick et al. | |
| 2021/0152526 A1* | 5/2021 | Kohout | H04L 43/08 |
| 2021/0184958 A1* | 6/2021 | Kolar | H04L 43/08 |
| 2021/0194851 A1* | 6/2021 | Barton | H04L 43/026 |
| 2021/0226968 A1* | 7/2021 | Kvochko | G06F 16/953 |

OTHER PUBLICATIONS

International Searching Authority, International Search Report mailed Sep. 30, 2021 for International Application No. PCT/US2021/037428. pp. 1-14.

* cited by examiner

750

'Selfcare Solutions - Ypsomed - Group English Deutsch Group Ypsomed Websites Group Australia Austria Belgium Canada Czech Republic Denmark Finland France Germany Italy Niederlands Norway Poland Spain Sweden United Kingdom Keywords Skip navigation Company Vision - Mission - Strategy Group structure Management team Sustainability & Social Responsibility Human Resources Policy Training and further education Environment Lean Management Risk management YpsoStories Our Employees History Suppliers Contact Subsidiaries and Distributors Delivery Systems Diabetes Care Jobs & Careers Vacant Positions Professionals Job beginners Apprenticeships For recruitment agencies Working for Ypsomed Career and continuing professional development Employee development programme Quality of life Working conditions and benefits Apprenticeship Training conditions at Ypsomed Recruiting Events Media & Investors Facts & Figures Press releases News Service Image gallery Financial calendar Annual General Meeting Reports Order printed reports Presentations Shares Financial analysts coverage Share key data Dividend Corporate Governance Code of Conduct Making selfcare simpler and easier The Ypsomed Group is a leading developer and manufacturer of injection and infusion systems for self-medication and a renowned diabetes specialist with over 30 years experience. Injection systems for self-medication Delivery Systems Ypsomed Delivery Systems (YDS) provides a complete range of technologies and services for reliable and user-friendly injection systems for self-medication. Our customers are pharmaceutical and biotechnology companies that develop, manufacture and market injectable therapies. We offer: Modular and proven platform technologies Comprehensive services tailored to our customers requirements A full range of in-house manufacturing capabilities Explore Ypsomed Delivery Systems Solutions for people with diabetes mellitus Diabetescare With its mylife Diabetescare brand, Ypsomed offers a comprehensive portfolio of products and services for people with diabetes. This allows users easy, discreet and reliable self-treatment. With mylife Diabetescare, self-treatment becomes simpler and easier. We offer: Infusion Systems Blood glucose monitoring systems Therapy management Pen needles Explore Ypsomed Diabetes Care Latest News Press Releases 23.05.2019 Ypsomed increases EBIT and invests in long-term profitability Read more Ypsomed increases EBIT and invests in long-term profitability 07.05.2019 Teva launches Copaxone with the YpsoMate autoinjector from Ypsomed Read more Teva launches Copaxone with the YpsoMate autoinjector from Ypsomed 21.12.2018 Ypsomed initiates arbitration proceedings against Insulet Corp. Read more Ypsomed initiates arbitration proceedings against Insulet Corp. 07.12.2018 First market entry of YpsoMate autoinjector from Ypsomed Read more First market entry of YpsoMate autoinjector from Ypsomed More news Enjoy simplicity mylife YpsoPump Discover the simplicity of our new insulin pump mylife YpsoPump. The easy-to-learn insulin pump system, which features the essential functions.

"StarDot Technologies Technologies - Security Channel Division - Manufacturer of Multi-Megapixel IP Cameras Skip to Navigation Call us! 877-275-1616, Monday-Friday, 6AM - 5PM AboutHistory ProductsNetwork CamerasSCH Series Panoramic 180 H.264 Dome SCH Series H.264 Box Camera SCH Series H.264 Dome Camera SC Series MJPEG Dome Camera SC Series MJPEG Box Camera NetCamLIVE2 Software Video EncodersExpress 8 Express 4 Express 2 AccessoriesMegapixel Lenses Wall Mount - Dome Compact Outdoor Enclosure SupportKnowledge Base Downloads Manuals CalculatorsBandwidth/Storage Calculator Lens Calculator ContactNorth America PartnersNVR Partners Distributors Login Check out our Multi-Megapixel Camera Solutions StarDot offers several solutions for the security market. Please select one of these categories for more information. MCLDC Retail Stores License Plate Capture Intelligent Video Beyond HD Streaming Simultaneous H.264, M-JPEG and Analog Streaming Simultaneous H.264, M-JPEG and Analog Multi-Megapixel Hybrid IP Camera with Vandal Resistant Design Multi-Megapixel Hybrid IP Camera Express 4 Video Server Ideal for Remote Monitoring Multiple Cameras Over the Internet and Local Area Network Solutions H.264 IP66 Dome H.264 Box Camera MJPEG Vandal Resistant IP Dome Camera MJPEG Box Camera MJPEG Box Camera Express 4 Video Server Newsletter Email: Latest News A+S Names StarDot MCLDC Product Line - Product of... 1 of 7 Welcome to StarDot Welcome to StarDot Technologies - US Engineered multi-megapixel (1.3, 3, 5, 10MP) network cameras and video servers (2,4,8 ports). NetCamLIVE (YouTube Streaming Camera). Leading digital image processor design since 1994. StarDot's cameras have earned a solid reputation for their high image quality, rugged all-weather design, ease of use and reliability. Where to Buy StarDot professional security products are sold through both international and domestic security channels. Please click the link below to find a distributor in your area. Are you looking for our NetCam XL series for your web-attraction use? Please visit stardot-tech.com AboutHistory ProductsNetwork Cameras Software Video Encoders Accessories SupportKnowledge Base Downloads Manuals Calculators ContactNorth America PartnersNVR Partners Distributors Login Search 2019 StarDot Technologies 2019 StarDot"

Fig. 8B

INFORMATION ENHANCED CLASSIFICATION

TECHNICAL FIELD

Aspects and implementations of the present disclosure relate to network monitoring, and more specifically, classification of entities of a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 7B depicts example aspects of data extracted from the webpage in accordance with one implementation of the present disclosure.

FIG. 8B depicts example aspects of data extracted from the additional webpage in accordance with one implementation of the present disclosure.

DETAILED DESCRIPTION

Figure 1:
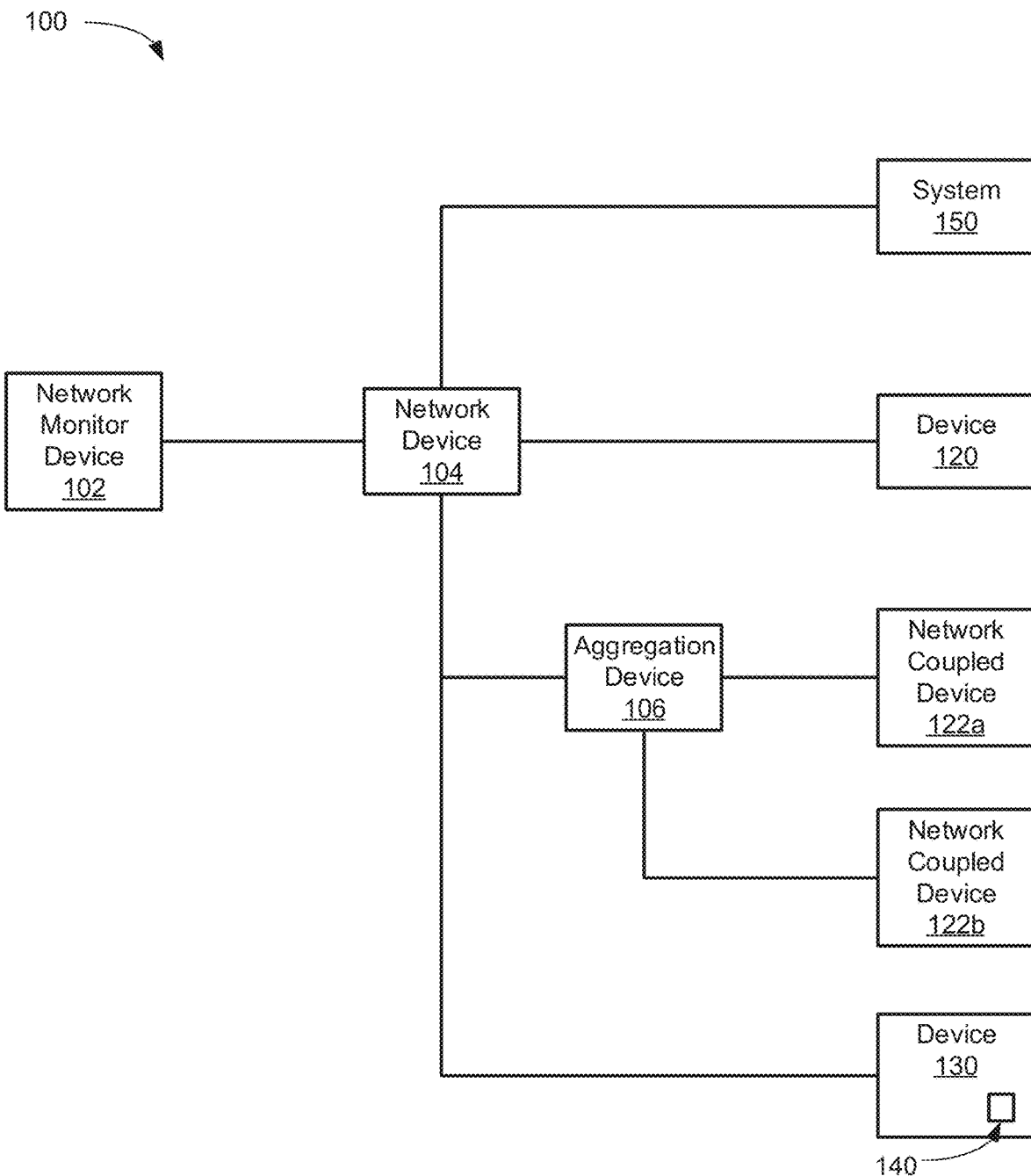
FIG. 1 depicts an illustrative communication network in accordance with one implementation of the present disclosure.

Aspects and implementations of the present disclosure are directed to training and using models (e.g., machine learning models, etc.) to perform classification of entities of a network (but may be applicable in other areas), with the model trained based on external data (e.g., from the Internet). The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification can be particularly important for securing a network because lack of knowledge about what a device is can prevent application of appropriate security measures. Accordingly, described herein in various implementations are systems, methods, techniques, and related technologies, which allow for improved classification of entities to enable securing of a network including performing one or more policies based on classification of an entity.

Accordingly, described herein in various implementations are systems, methods, techniques, and related technologies, which enable better classification by using publicly available data (e.g., data from the Internet). The usage of external data allows classification of less common entities or devices (e.g., entities made by smaller companies). Embodiments improve overall classification while allowing dynamic (e.g., on-the-fly) classification of an entity.

One of the problems with classifying devices on a network is that the data might be incomplete or the quality might be low. The quality can be based on the number of properties available or could be how useful the available properties are. A low quality property might be a property that is not very useful for classification (e.g., common among many devices). When using properties (e.g., HTTP, DNS, etc.), the quality of the property values may not be enough to assign a function to a device or classify a device. When the data is incomplete or the quality low, there may not be enough information to accurately classify a given device. Further, the availability of properties is often different for known and unknown devices. Thus blindly applying machine learning (ML) trained on the known set with good quality data will result in inferences on the unknown set, which have bad quality data, being not suitable for production use. For example, if training data has on average 10 available properties per sample while unknown data has on average 2 available properties per sample, the model prediction accuracy could be poor.

Embodiments provide a methodology to bridge this data quality gap and a way to use other dimensions of data which may have consistent distributions for both knowns and unknowns to achieve better classification predictions or determinations. Embodiments use available data (e.g., property values associated with an entity, for instance, available via network traffic) as a seed set to gather external information which is then used to improve classification. The gathered external information can complement the data already available so that the classification can be improved over time as well.

To deal with discrepancies of property distribution, embodiments use features or information from the Internet or one or more webpages to provide better accuracy and robustness. The data for the known set of entities (e.g., entities that can be classified or have a known classification, for instance, above a threshold) may be considered high quality. The data can be considered high quality due to there being several properties available (e.g., 10 properties per sample). There may be only two properties available for the unknown set (e.g., entities that are not able to be classified or do not have a known classification, for instance, have a classification below a threshold) per sample. This difference in properties available for the known set and the unknown set create a discrepancy of property distribution. Embodiments use web data or data from the Internet where the availability of data (e.g., properties and associated values) is similar across both the known and unknown set.

For example, if there are 10 properties per sample for the known set in the web data, there will likely be 10 properties per sample for the unknown set in the web data. The use of the web data substantially results in an equalization of the distribution of properties across the known and unknown sets. Embodiments can thus bridge the data quality gap by using web data. Embodiments are thus able to compensate for the lack of properties in the unknown set with web or Internet data to bring the properties for both the known and unknown set into a more similar distribution.

Embodiments further help solve the problem of being unable to classify devices from the long tail of many smaller companies that only make one or two products for specialized environments (e.g. healthcare, manufacturing, etc.). This classification gap is in part because of the resources needed to profile the large quantity of devices available from the many small vendors. For example, the resources to profile and study each device from every company quickly becomes impractical when profiling involves purchasing each device and studying the device in a laboratory setting. In some embodiments, the information used as a seed to gather the external information is a cloud based information resource (e.g., with information from many entities from many different networks).

In some embodiments, a web crawler is used to gather the external information. A web crawler is operable to send requests for one or more webpages, receives webpages (e.g., including search engine results) and follow one or more links (e.g., HTTP links) with the webpages. The web crawler may be software, hardware, or a combination thereof. The web crawler may perform one or more internet searches based on various property values. Embodiments can thus leverage information from vendor websites to assist a model in making a classification decision or determination. In some embodiments, the web crawler performs relevant search queries based on entity vendor or other selected property information obtained from a cloud resource with entity information.

The searches may be performed using an Internet search engine (e.g., Google™, Bing™ etc.). For example, the web crawler can access a vendor value (e.g., based on organizationally unique identifier (OUI) of a MAC address or DHCP vendor class) and use one or more heuristics to do web or Internet searches based on the vendor value. The heuristics are words, terms, or combinations thereof that can be selected to help determine the product or products that a vendor makes or what a vendor is doing. The heuristics may add context to the data to enable more relevant search results. The heuristics may include "about," "products," etc. For example, for a vendor of "axis cameras," example search terms may include "axis cameras", "about access cameras", and "axis camera products". Heuristics may thus be used to enable more precise search results for products by the vendor, information about the vendor, or a product list of the vendor.

In some embodiments, the web crawler may further search any property value. For example, DHCP values, user agent strings, etc., can be searched with a search engine by the web crawler.

The web crawler may take the top few search results or webpages, access the websites or webpages, and on each website, remove tags, styles, script, and code information, to get the body (or text) content of the webpage. The information that is extracted from the website to end up with text that is not code. The text associated with the entity can be used for classification and may be put in a database to enhance classification capabilities. The web crawling be done for each individual entity of a network. In some embodiments, a third party system may be used to gather the webpage information used by embodiments.

The web crawler may access a webpage or gather information from the top result URL of the search results from a search engine for each query. The data from the webpage may be compared against a keyword list. A keyword list may be a list of words determined (e.g., predetermined) to be relevant to one or more classifications. For example, the keywords may be manually defined for IT and OT buckets or categories based on domain knowledge, existing classification taxonomy structure or a combination thereof. In some embodiments, the keyword list is selected based on a property. For example, if a vendor is associated with OT entities may then an OT keyword list may be selected.

In some embodiments, the web crawler can access a specific keyword lists associated with a particular category or classification. For example, a vendor webpage may have a list of keywords including radiology, healthcare, X-ray, MM, etc., and a keyword list for healthcare may be used match keywords for that webpage and to classify the entity.

The data may then be featurized into a keyword count matrix. The keywords may thus encode domain knowledge into a numeric form consumable by a ML model. Embodiments may count the presence or number of occurrences of keywords (e.g., a count for a keyword may be zero or greater) in the external information gathered.

The data accessed from the Internet, e.g., by the web crawler, may thus complementary existing classification information and enable improved classification. For example, embodiments are able to deal with an unknown entity which has a property set which is uniquely different from the currently known set of entities.

The keyword level is one level of information extraction and correlation used to enhance classification. In some embodiments, NLU (natural language understanding) and deep learning may be used in place of the keywords used to extract data from one or more webpages. NLU processing can be used to analyze the words and sentences of a webpage to derive meaning and details from the webpage. Deep learning, e.g., using a recurrent neural network (RNN) or convolutional neural network (CNN), may be used to understand or derive meaning from the webpage. The output of the NLU or deep learning algorithms may be used to represent and incorporate web information to be used for classification. NLU, deep learning, or other methods may be used to correlate the contents of a webpage to a taxonomy node (e.g., in a classification hierarchy) for classification. For example, the output of NLU or deep learning methods may be a regression or a probability of a taxonomy node (e.g., in a classification structure).

Embodiments are well suited for situations where network information is insufficient for classification. For example, an X-ray machine which has a static IP, may not have DHCP information or properties available. Active probing may not be available because of the nature of the risk of probing medical devices. The lack of active probing may result in Nmap information, open port information, information available via HTTP or HTTPS requests, SNMP requests, WMI requests, standard OT protocol requests, or proprietary protocol based requests or other properties not being available. The MAC address can be captured (e.g., based on passive monitoring of network traffic) and used to determine a vendor which is used to search the web to determine the products, entities, or devices the vendor makes (e.g., based on keywords). The data from the crawler will thus be able to offset the lack of network information to make classification possible.

The data from the web crawler can be uploaded to a cloud resource (e.g., cloud entity data store 268) to further enhance the data available for classification. It can further be used to populate a model based on the network information and external information gathered thereby improving classification capabilities.

In case of large companies who make many products, it may still be useful to use external data in the higher layers of classification, for example, Siemen™ makes OT entities. For large categories in the unknown set, there may be a lot of small vendors making products which have not been previously observed or classified. Using vendor and the web crawler allows better classification of IT/OT, healthcare, etc., at higher layers of classification. Embodiments are useful for smaller vendors which may not be as common due there being thousands of small companies making devices. New entities from new vendors are introduced into networks frequently. In some cases, the new vendors are startups which will have websites that embodiments can access and extract data to perform classification while an entity or device of the new vendor may not have otherwise been previously classified.

More granular classification results may be derived from bootstrapping or building upon on a higher level classification result. The use of data from the Internet (e.g., via the web crawler) provides a source of data besides data from the network (e.g., property values) thereby enabling more granular classification that might not otherwise be available via the data from the local network or a cloud resource (e.g., with entity data). For example, property values associated with an entity from a local network may not be enough to classify the entity as an OT or IT entity. Embodiments may use data from the Internet to determine that the entity is an is an OT entity. The classification of the entity as an OT entity may then allow the property values associated with the entity to be used to further classify the entity (e.g., using a specialized OT model, OT specific profiles, OT specific fingerprints, etc.), for instance, as a healthcare entity or device. In addition, the classification of the entity as an OT entity may allow one or more OT related policies (e.g., performing one or more security actions) to be applied.

Embodiments advantageously allow enhancement of the information gathered from the network with external information to improve classification. This is particularly useful in cases where there is limited network information or less common entities from smaller vendors. Embodiments solve the problem of many small vendors who make entities or devices that are not common and enables better classification of these entities. In addition, embodiments allow better training of machine learning models by using both entity based data (e.g., property based data) and external data (e.g., from one or more webpages). The external data is normally not part of network data and is complementary to network data. Embodiments may further be used with machine learning based classification that uses models of various granularities.

In some embodiments, a data store (e.g., database) of external data (e.g. webpage based data collected and distributed as a database) may be used to classify an entity. Data accessed from the Internet or webpages associated with an entity may be compared with data in the data store to classify the entity. This can allow "offline" classification that leverages external data (e.g., pre-gathered data from one or more webpages and associated with one or more classifications). In various embodiments, a data store of external information, e.g., data gathered from the Internet or webpages, can be used to train machine learning models for classification and thereby improve classification.

Accordingly, described herein in various implementations are systems, methods, techniques, and related technologies, which may perform classification, training of models for classification, or a combination thereof. As described herein, various techniques can be used to perform classification using external information (e.g., data from the Internet) and train models for use in classification using external information (e.g., data from the Internet).

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically (e.g., on the fly or responsive to changing conditions, for instance, an entity being communicatively coupled to a network or in response to determination of characteristics of an entity) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining one or more properties, one or more classifications using external data (e.g., from a webpage), security actions, as described herein. Network monitor device 102 can perform the classification using one or more properties associated with an entity to perform one or more searches (e.g., via search engine). The one or more webpages of the search results can be used to classify the entity. The classification may be determined by a model using the data from the one or more webpages as input. A confidence may be determined with each classification and compared with a threshold (e.g., confidence threshold) associated with the model to determine whether the classification should be used (e.g., for performing an action, security policy, etc.). In some embodiments, network monitor device 102 can use local resources (e.g., a local model or local data store, for instance with webpage results therein), cloud resources (e.g., a model or a data store with webpage results therein), or a combination thereof for performing the classification. In various embodiments, the classification from the model may be combined with one or more classifications based on a profiles, fingerprints, etc., as described herein.

Network monitor device 102 may further train a model for use in determining or inferring a classification. Each model may be trained with external data (e.g., from one or more webpages associated with one or more properties) to classify an entity, as described herein. The trained models may be deployed locally, in the cloud, or a combination thereof for classification by one or more network monitor entities.

Network monitor device 102 can determine one or more enforcement points where the entity is communicatively coupled to the network and thereby determine the one or more enforcement points closest to the entity. For example, network monitor device 102 may access information on a switch (e.g., a switch cache) to determine a port (e.g., physical port, wireless port, or virtual port) where an entity with a particular IP address or MAC address or other identifier is communicatively coupled. Network monitor device 102 may also access information from a wireless access point where the entity is communicatively coupled. In some embodiments, network monitor device 102 may poll information from a cloud service to determine where an entity is communicatively coupled or connected to a network. In various embodiments, network monitor device 102 access syslog or SNMP information from an entity itself to determine where an entity is communicatively coupled or connected to a network (e.g., without accessing information from a network entity or enforcement point). Network monitor device 102 supports applying access policies in situations where an entity is communicatively coupled to a network with more than one connection (e.g., a wired connection and a wireless connection).

Based on the enforcement point, network monitor device 102 determines the one or more access rules to be assigned to the one or more enforcement points based on an access policy. In some embodiments, based on information about the one or more enforcement points closest to the entity, network monitor device 102 translates the access policy into one or more commands that will be used to configure the access rules on the one or more enforcement points. The closest enforcement point to an entity can be enforcement point where the entity is communicatively coupled. The enforcement point may be network device or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor device 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor device 102 may then apply or assign the access rules to the one or more enforcement points closest to the entity. Network monitor device 102 may communicate the access rules via application programming interfaces (APIs), command line interface (CLI) commands, Web interface, simple network management protocol (SNMP) interface, etc. In some embodiments, network monitor device 102 may verify that the one or more enforcement points have been properly or correctly configured based on the access rules.

Network monitor device 102 may provide an interface (e.g., a graphical user interface (GUI)) for viewing, monitoring, and modifying classification or associated thresholds associated one or more models, as described herein. Network monitor device 102 may further monitor network traffic over time to reclassify entities as new entities join the network, entities rejoin the network, and new models are made available.

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

An enforcement point may be a router, firewall, switch, hypervisor, software-defined networking (SDN) controller, virtual firewall, or other network device or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the entity on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or 3rd party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
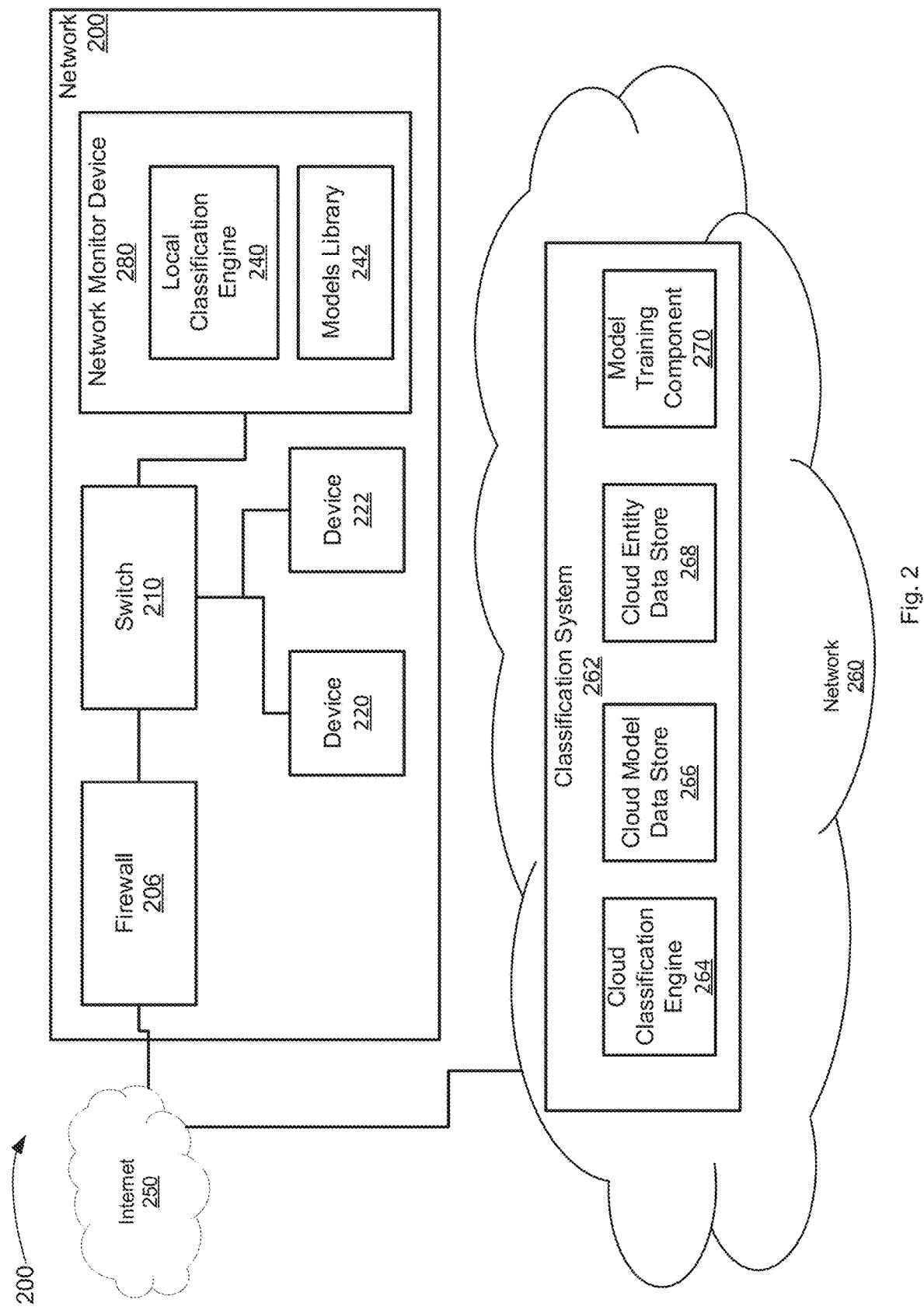
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor device 280 (e.g., network monitor device 102) which can perform or determine one or more classifications, as described herein, associated with the various entities communicatively coupled in example network 200. Network monitor device 280 may further perform training of one or more models for use in classification, as described herein. Example components are shown of network monitor device 280 and classification system 262 and other components may be present or included.

FIG. 2 shows example devices 220-222 (e.g., devices 106, 122*a-b*, 120, and 130, other physical or virtual devices, other entities, etc.) and it is appreciated that more or fewer network devices or other entities may be used in place of the devices of FIG. 2. Example devices 220-222 may be any of a variety of devices or entities (e.g., OT devices, IoT devices, IT devices, etc.), as described herein. Enforcement points including firewall 206 and switch 210 may be any entity (e.g., network device 104, cloud infrastructure, etc.) that is operable to allow traffic to pass, drop packets, restrict traffic, etc. Network monitor device 280 may be any of a variety of network devices or entities, e.g., router, firewall, an access point, network access control (NAC) device, intrusion prevention system (IPS), intrusion detection system (IDS), deception device, cloud-based device or entity, virtual machine based system, etc. Network monitor device 280 may be substantially similar to network monitor device 102. Embodiments support IPv4, IPv6, and other addressing schemes. In some embodiments, network monitor device 280 may be communicatively coupled with firewall 206 and switch 210 through additional individual connections (e.g., to receive or monitor network traffic through firewall 206 and switch 210).

Switch 210 communicatively couples the various devices of network 200 including firewall 206, network monitor device 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor device 280 can access network traffic from network 200 (e.g., via port mirroring or SPAN ports of firewall 206 and switch 210 or other methods). Network monitor device 280 can perform passive scanning of network traffic by observing and accessing portions of packets from the network traffic of network 200. Network monitor device 280 may perform an active scan of an entity of network 200 by sending one or more requests to the entity of network 200. The information from passive and active scans of entities of network 200 can be used to determine one or more properties associated with the entities of network 200.

Network monitor device 280 includes local classification engine 240 which may perform classification of the entities of network 200 including firewall 206, switch 210, and devices 220-222. Network monitor device 280 further includes models library 242 which includes one or more models and thresholds (e.g., confidence thresholds) associated with the models. The models of models library 242 may have been trained locally (e.g., by network monitor device 280), in the cloud (e.g., by classification system 262), or a combination thereof. In some embodiments, the thresholds may be customized based on user input, configured in association with training, or a combination thereof. Local classification engine 240 may perform classification (e.g., blocks of flowchart 400) of the entities of network 200 using one or more models of models library 242 using data (e.g., one or more webpages) accessed via Internet 250. In some embodiments, the use of one or more models with selected properties associated with each model may enhance classification that is otherwise limited by active scans not being available in an environment (e.g., an environment with entities that are sensitive to or not able to handle active scanning).

In various embodiments, models library 242 may include a data store (e.g., database) of classifications and associated properties values based on external data (e.g., webpages of Internet 250) which may be used to classify an entity based on property values of the entity matching properties values within the data store. The classification associated with the matched property values may be output by classification engine 240.

Classification system 262 may be a cloud classification system operable to perform classification of an entity using external data, as described herein. In some embodiments, classification system 262 may be part of a larger system operable to perform a variety of functions, e.g., part of a cloud based network monitor entity, security entity, etc. Classification system 262 may further be operable to train one or more models based on external data, as described herein.

Local classification engine 240 can send data (e.g., properties and properties values) about entities of network 200, as determined by local classification engine 240, to classification system 262. Local classification engine 240 may encode and encrypt the data prior to sending the data to classification system 262. In some embodiments, local classification engine 240 checks the confidence of each classification result and communicates with classification system 262 data to perform a classification where a confidence threshold has not been met. Local classification engine 240 may receive a classification result from classification system 262 which network monitor device 280 can use to perform various security related measures. In some embodiments, classification of an entity may be performed in part by local network monitor device 280 (e.g., local classification engine 240) and in part by classification system 262.

Classification system 262 can perform a cloud based classification using external data (e.g., via a search and one or more associated webpages accessed via Internet 250), as described herein. In some embodiments, classification system 262 includes cloud classification engine 264, cloud model data store 266, cloud entity data store 268, and model training component 270.

Cloud classification engine 264 may perform classification (e.g., blocks of flowchart 500) based on data received from network monitor device 280 (e.g., properties) and external data (e.g., via a search and one or more associated webpages accessed via Internet 250), as described herein. Cloud classification engine 264 may unencrypt and decode the information received prior to performing a classification. Cloud classification engine 264 may use cloud model data store 266 in determining a classification based on one or more models trained to classify an entity using, at least in part, external data (e.g., one or more webpages). A classification determined by cloud classification engine 264 can be sent back to network monitor device 280.

Cloud model data store 266 is model data store (e.g., a cloud model database) with each model associated with select properties and trained with external data (e.g., for classifying an entity at a particular granularity using external data), as described herein. Cloud profile data store 266 is not subject to the resource conditions or limitations (e.g., processing power, storage, etc.) that may impact network monitor device 280 (e.g., and local classification engine 240).

In various embodiments, cloud model data store 266 may include a data store (e.g., database) of classifications and associated properties values based on external data (e.g., webpages pre-gathered and processed to be used for classification) which may be used to classify an entity based on property values of the entity matching properties values within the data store. This classification may be determined based on the data in the data store instead of accessing one or more webpages via Internet 250. The classification using the data store based on external data may thus be considered offline classification using external data. The classification associated with the matched property values may be output by cloud classification engine 260.

Cloud entity data store 268 is a data store (e.g., a cloud entity database) of entity information that has been uploaded to classification system 262. For example, the data in cloud entity data store 268 may include entity or device name, operating system, function, vendor/model, and host information from a variety of network (e.g., that have network monitor entities configured to upload entity information).

Model training component 270 is configured to train one or more models using external data (e.g., blocks of flowchart 400), as described herein. The data of cloud entity data store 268 may be used by model training component 270 to train one or more models at various granularity levels using external data (e.g., based on the property values associated with entity information of cloud entity data store 268), as described herein. Cloud entity data store 268 may be used to train one or more of the models of cloud model data store 266. Model training component 270 may further evaluate models and determine respective confidence thresholds and parameters associated with each model, as described herein.

Both local classification engine 240 and cloud classification engine 264 may use profile based classification, fingerprint based classification, along with other classification methods in conjunction with classifications based on various models associated with external data.

Figure 3:
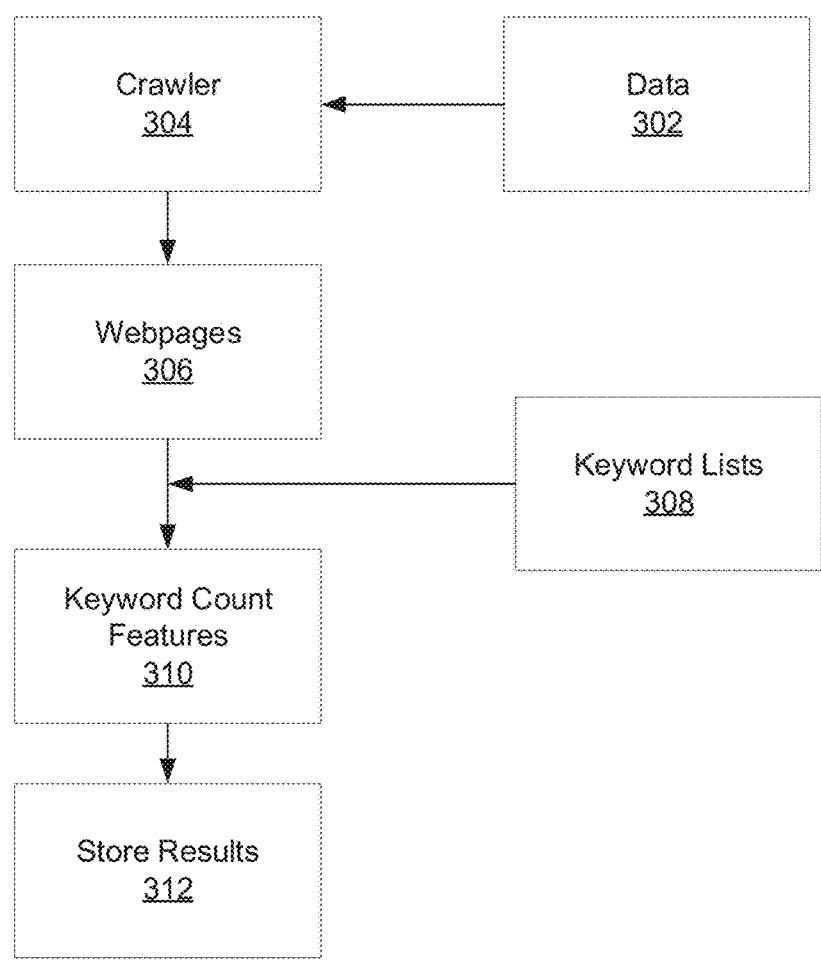
FIG. 3 depicts a diagram of aspects of classification using external data in accordance with one implementation of the present disclosure.

FIG. 3 depicts a diagram of aspects of classification using external data in accordance with one implementation of the present disclosure. FIG. 3 depicts an example flow of data and example output. Various blocks of flowcharts 400-600 may perform one or more operations associated with the flow of data or operations as shown in FIG. 3. Various portions of FIG. 3 may be performed by a network monitoring entity (e.g., network monitoring devices 102-280)

Data 302 can include one or more property values associated with each entity of a plurality of entities. Data 302 may include one or more properties and property values associated with a selected entity (e.g., selected based on being communicatively coupled to the network, selected as part of a scan or classification scan of a network, for instance, periodically or upon an update of a model or classification information). The property values may be determined as described herein. Data 302 may be selected or refined, as described herein, by a network monitor device (e.g., network monitor device 102 or 280).

Data 302 is accessed by crawler 304. Crawler 304 may be a web crawler, as described herein. Crawler 304 may use data 302 as a seed set for performing various search queries. For example, the searches may be based on the property values (e.g., vendor based on MAC address or DHCP information, user agent, digital imaging and communications in medicine (DICOM) unique identifiers (UIDs), Nmap strings, etc.) of data 302. The properties of data 302 may be combined with one or more heuristics, as described herein. Crawler 304 initiates one or more searches or search queries based on data 302 via a search engine or search engine website (e.g., Google.com).

Crawler 304 then receives webpages 306 in responses to the one or more search queries. The webpages 306 can include a webpage with a list of search results and one or more webpages associated with the top or first search result uniform resource locator (URL) associated with a search query. Crawler 304 can access the webpages of the top or first search results. Code portions (e.g., hypertext markup language (HTML) code, JavaScript code) and other non-text portions (e.g., images), ads, etc., may be removed from the accessed webpages 306. In some embodiments, text may be determined from images (e.g., via optical character recognition (OCR) or other image processing methods) and used along with text from the webpages.

The webpages 306, or the content extracted therefrom, may then be matched or checked to see if any of the words from webpages 306 matches any words of keyword list 308. Keyword lists 308 may include lists of words associated with IT entities, OT entities, entity functions, operating systems (OSes), operating system versions, operating system patch or service pack levels, etc. In some embodiments, the keyword lists 308 may be determined by a user or researcher. In various embodiments, the keyword lists 308 may be determined by NLU or deep learning.

Based on the matches of words in the keywords lists 308, keyword count features 310 may be determined. Keyword count features 310 may be the number of occurrences of each word in keyword list 308 (e.g., counts for matched keywords greater than zero). For example, the keyword count features 310 based on webpages 306 may include a count of X-ray machine being mentioned 10 times and medical devices being mentioned 15 times in a webpage.

FIG. 7-8 include example webpages, extracted text including keywords. In some embodiments, the keyword count features and other information determined by the web crawler can be output to a data store and may be combined with other entity data stores (e.g., cloud entity data store 268) to improve classification.

The keyword count features 310 may then be used for classification. For example, the keyword count may be represented as a matrix or vector of numbers, with the count for each match of a keyword at each position within the matrix or vector. The matrix or vector can then be used to determine or infer a classification using a model (e.g., as described with respect to FIG. 5).

For a training a model, a matrix or vector may be determined for each of a plurality of entities. Each matrix row or vector may be labeled or associated (e.g., with classifications) and then use to train a model, e.g., using machine learning. The trained model may be then be used to classify an entity based on a matrix or vector determined based on one or more properties associated with that entity used to search for one or more webpages.

Figure 4:
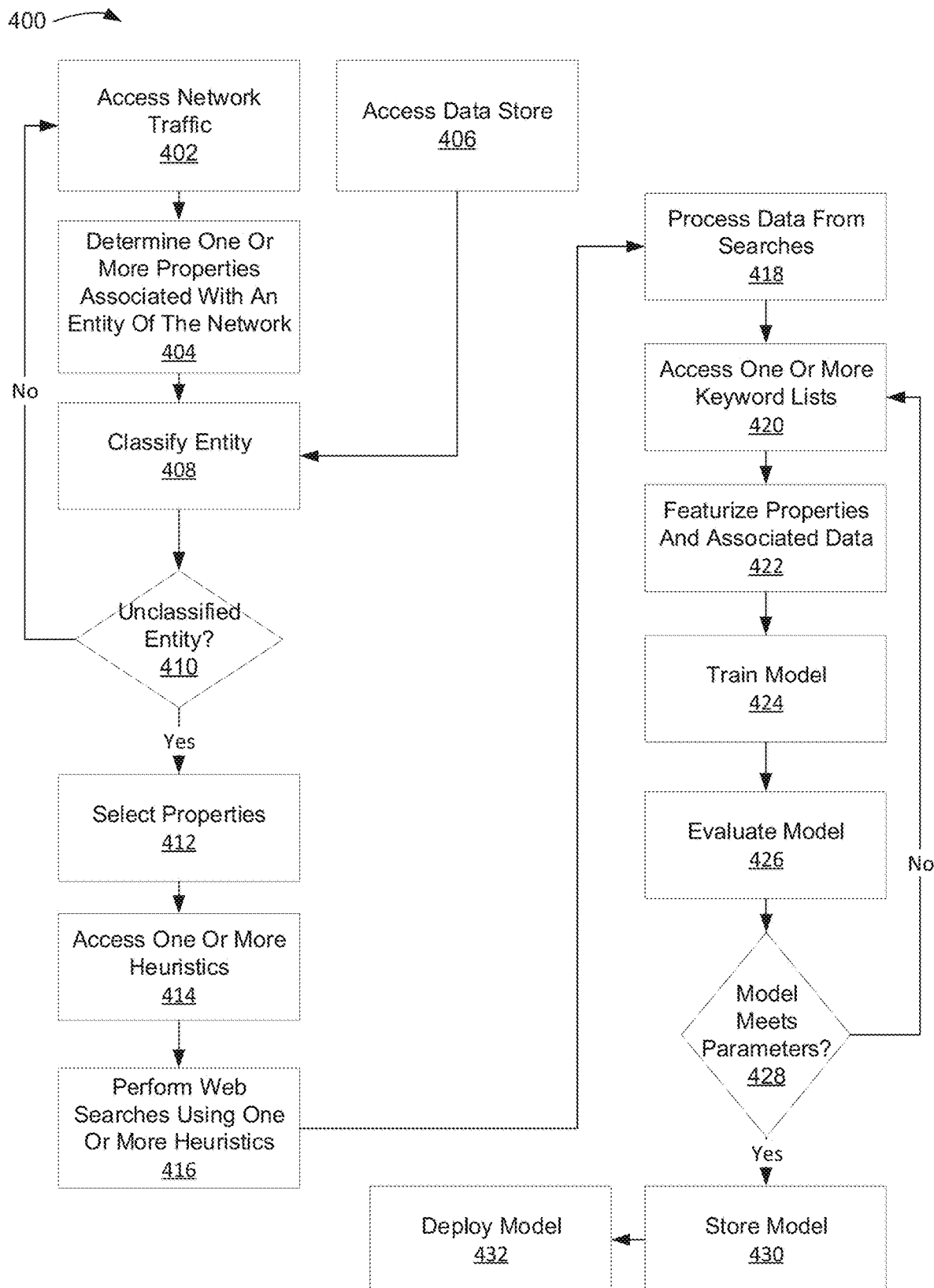
FIG. 4 depicts a flow diagram of aspects of a method for training a model using external data in accordance with one implementation of the present disclosure.
Figure 5:
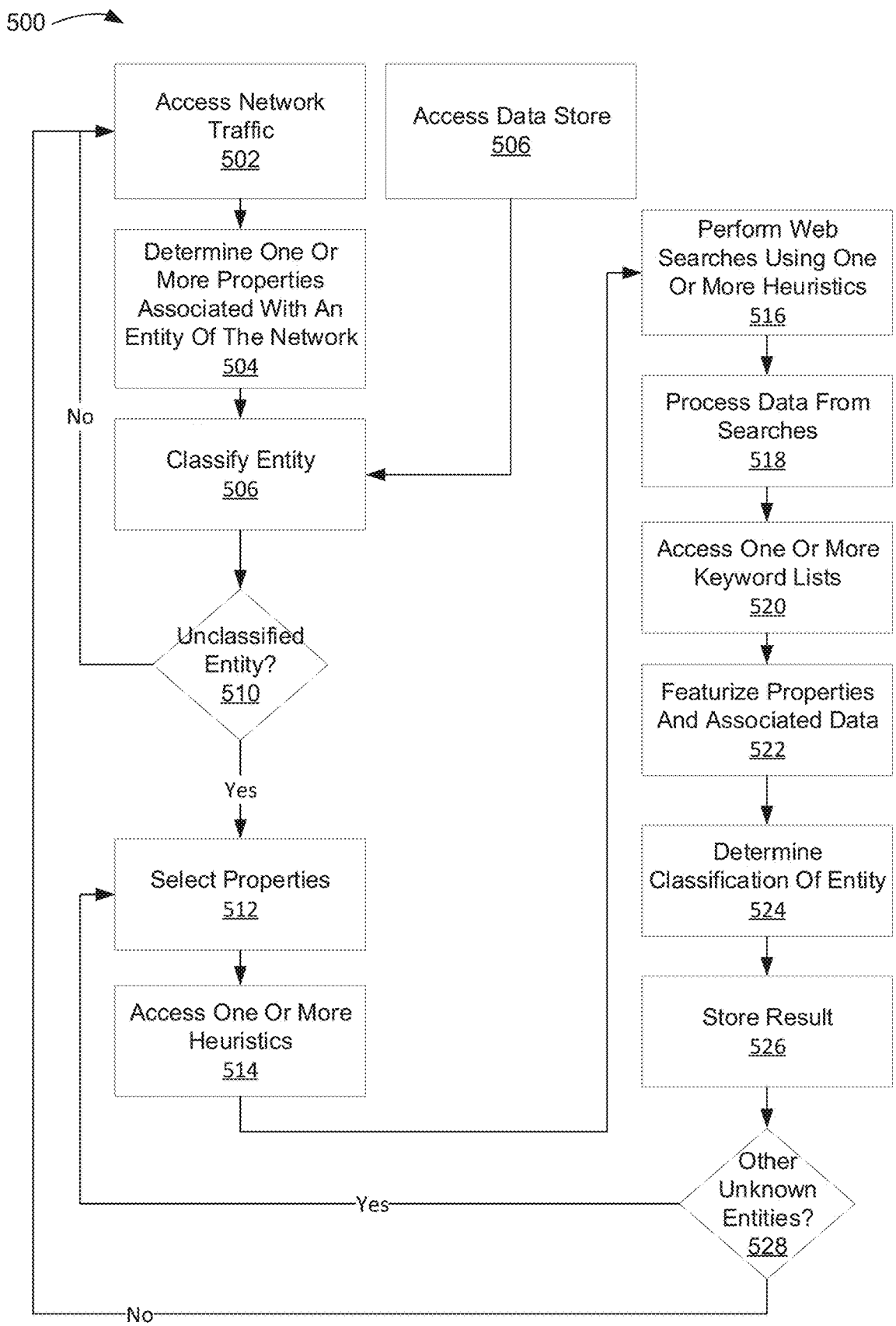
FIG. 5 depicts a flow diagram of aspects of a method for determining a classification using a model in accordance with one implementation of the present disclosure.
Figure 6:
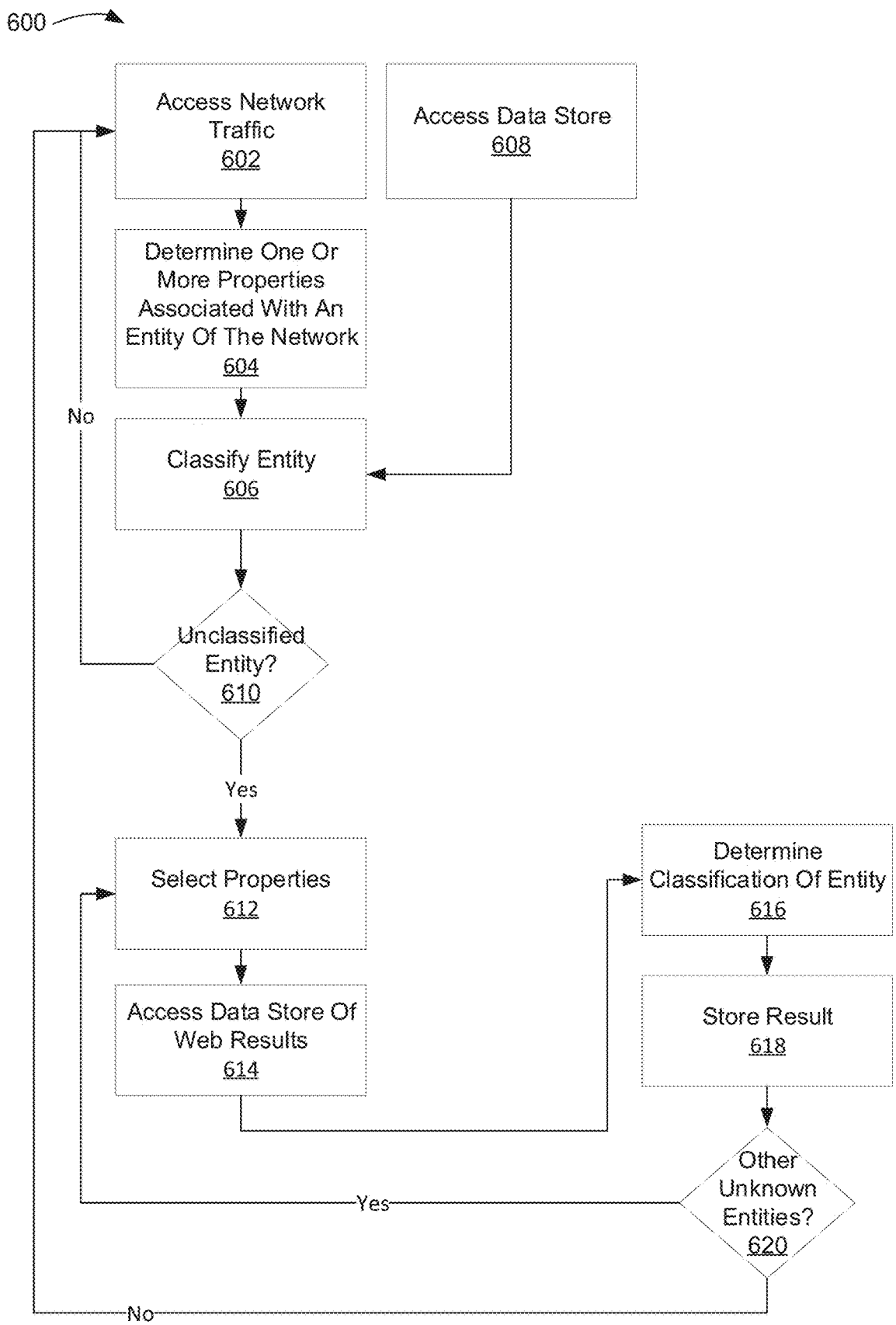
FIG. 6 depicts a flow diagram of aspects of a method for determining a classification using a data store in accordance with one implementation of the present disclosure.

With reference to FIGS. 4-6, flowcharts 400-600 illustrate example operations used by various embodiments. Although specific operation blocks ("blocks") are disclosed in flowcharts 400-600, such blocks are examples. That is, embodiments are well suited to performing various other blocks or variations of the blocks recited in flowcharts 400-600. It is appreciated that the blocks in flowcharts 400-600 may be performed in an order different than presented, and that not all of the blocks in flowcharts 400-600 may be performed. The blocks of flowcharts 400-600 may be performed locally by an entity, in a cloud, or a combination thereof. One or more models may be trained in the cloud, locally, or a combination thereof by the blocks of flowchart 400. One or models (e.g., the models trained by blocks of flowchart 400) may be used to determine one or more entity classifications locally, in the cloud, or a combination thereof (e.g., by the blocks of flowchart 500).

FIG. 4 depicts a flow diagram of aspects of a method for training a model using external information or data in accordance with one implementation of the present disclosure. Various portions of flowchart 400 may be performed by different components (e.g., components of system 900) of an entity (e.g., network monitor device 102 or network monitor device 280). Flowchart 400 depicts a process for training a model based on external data (e.g., from one or more webpages). Various blocks of flowchart 400 may be performed to carry out various portions or operations described with respect to FIG. 3.

At block 402, network traffic is accessed. The traffic may be accessed by a network monitoring entity (e.g., network monitoring devices 102 or 280) via a port mirroring or SPAN port or via another method, as described herein. The traffic data may include one or more properties and property values for each entity communicatively coupled to one or more networks. The one or more properties and property values may be extracted from the traffic data. The traffic may include active scanning properties (e.g., if active scanning is enabled).

In some embodiments, data (e.g., including properties and property values) is further accessed from third party systems (e.g., system 150, an external system, etc.) and used along with traffic data. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 404, one or more properties associated with each entity of the network are determined. The properties can include data or values extracted from network traffic (e.g., packets) associated with each entity. For example, one or more properties and property values may be extracted or accessed based on one or more keywords or variables associated with portions of a packet, protocol fields, information from Nmap, information from p0f, data from active scans (e.g., probing or sending requests to an entity), etc. Each property may be stored as a property key (e.g., property name) and value (e.g., data of the property) pair. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network agentlessly or without involvement of an agent (e.g., software for collecting the properties running on the entity sending the packets).

The properties may further include identification information (e.g., serial number, etc.), device categorization, user categorization, location, compliance, risk, or a combination thereof which may be based on fingerprints, signatures, entity behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 400.

At block 406, a data store is accessed. The data store may be a local or cloud resource (e.g., cloud entity data store 268) with information of various entities (e.g., properties and associated values). The data store may include entity data (e.g., properties and property values) from one or more network monitoring entities (e.g., network monitor devices 102 and 280) that have been uploaded data. The data store may be organized or configured for use in training or classifying entities.

At block 408, the entity is classified. The entity may be classified using a model (e.g., ML model) based classification, profile based classification, fingerprint based classification, etc., or a combination thereof. The entity may be classified based on the properties and property values associated with the entity. If the entity cannot be classified (e.g., with a confidence above a threshold), the classification result will be unclassified.

In some embodiments, block 408 may be performed as part of the classifying each entity such that classified entities will be in a known set and unclassified entities will be in an unknown set. The known and unknown sets may then be used to train a model.

At block 410, whether the entity is unclassified is determined. If the entity is unclassified, block 412 may be performed. If the entity is classified, block 402 may be performed.

At block 412, properties associated with the entity are selected. The properties and associated values may be selected to be a seed set (e.g., data 302) which will be used to query or search for webpages, as described herein. The properties may include NIC vendor, DHCP properties, user agent, Nmap, open ports, etc.

At block 414, one or more heuristics are accessed. The heuristics are words, terms, or combinations thereof selected to help define the product that a vendor makes or what a vendor is doing (e.g., manufacturing, making, providing services, etc.). Heuristics may thus be used to enable more precise search results for products by the vendor, information about the vendor, or a product list of the vendor. The heuristics may thus add context to the data to enable more relevant search results. The heuristics may include "about," "products," etc.

At block 416, one or more searches, e.g., via search engines, using one or more heuristics are performed. For example, for a vendor of "axis cameras," example search terms may include "axis cameras", "about access cameras", and "axis camera products". A search may be performed for any property value. For example, DHCP values, user agent strings, etc., can be searched with a search engine (e.g., via a web crawler).

At block 418, the data from the searches is processed. The processing may include removing code (e.g., HTML code, JavaScript, etc.) and other non-text content (e.g., images). The processing may thus extract the text from the webpages.

In some embodiments, text may be determined from images (e.g., via optical character recognition (OCR) or other image processing methods) and used along with text from the webpages.

At block 420, one or more keyword lists are accessed. The keyword lists may be lists of terms associated with one or more classifications or suggested classifications. The keywords may be manually defined buckets or categories (e.g., IT or OT categories) based on domain knowledge, existing classification taxonomy structure or a combination thereof. The keywords may be used to encode domain knowledge into a numeric form consumable by a ML model. Embodiments may count the presence or number of occurrences of keywords (e.g., a count for a keyword may be zero or greater) in the external information gathered, as described herein. It is appreciated the keyword lists may be used with machine learning and may not be needed with deep learning, NLU, or other methods. For example, deep learning and NLU may be used to determine the keywords of a webpage.

TABLE I example IT keyword and OT keywords.

| | |
|---|---|
| Fax server | Angiography |
| Voice server | Angiography machine |
| Network solution | Aquarium |
| Network integration | Aquarium controller |
| Network management | Aquarium monitor |
| Data center network | Access card |
| Networks | Assistance |
| Wi-Fi | ATM |
| Session border controller | Automation |
| Media gateway | Automotive |
| VOIP solution | Baby |
| Gaming kit | Baby Monitor |
| Game pad | BACnet |
| Dialup modem | BACnet broadcast management |
| Cellular Modem | BACnet router |
| Network Tap | Barcode |
| Fax modem | Barcode scanner |
| LTE router | Bed |
| Video on Demand | Biometry |
| Aggregation Switch | Blood |
| L2 Switch | Blood glucose monitor |
| L3 Switch | Blood pressure monitor |
| Indoor Access Point | |
| Access Point | |
| IT keywords | OT Keywords |

Example keywords for IT and OT are shown in Table I. Example keywords of Table I may be used by embodiments to match keywords of webpages used to train a model to classify an entity as an IT entity or an OT entity.

Keywords may also be associated with various fields. For example, healthcare keywords may include injection, diabetes, medication, pharmaceutical, treatment, infusion system, blood, glucose, biotechnology. As another example, surveillance keywords may include IP camera, network camera, dome camera, box camera, camera, megapixel, lens, analog video, and professional security. As yet another example, industrial control system keywords may include programmable logic controller (PLC), power plants, transformers, etc.

At block 422, properties and associated data are featurized. The properties, property values, keyword counts, keywords matched, or some combination thereof may be featurized. Featurization is the process of encoding information into numerical form for use with one or more models. For example, the featurization may include converting one or more values associated with a property (of an entity) into a numerical form, e.g., a vector or a matrix, that can be processed by a machine learning trained model or used for training a model. A keyword count may be stored in a portion of the vector. The information in numerical form can then be used to train a machine learning model to be able to infer or determine a classification. A feature may be a set of distinguishing characteristics for each class of an entity. For example, a feature may be a set of particular properties associated with a particular class of entities. In some embodiments, the featurization may be based on keyword counts, a hash table, etc.

In various embodiments, the properties and associated data (e.g., property values, keyword counts, keywords matched, etc.) may be featurized using n-grams (e.g., representing multiple words or sequences of letters), for instance, 2-grams, 4-grams, etc., or term frequency-inverse document frequency (tf-idf) scores.

At block 424, a model is trained. The featurized data may be used to train the model. The model may be trained using standard training methods. Embodiments may use training methods including training the models on unknowns sets of entities, e.g., the properties associated with unknown sets, as described herein. The training may further be based on training the model for an associated granularity (e.g., to determine or classify an OT entity type) with associated or selected data (e.g., properties associated with OT entity type). Embodiments may train models at different granularities using various collections of data (e.g., data selected based on a granularity for training a model).

In some embodiments, the training may be performed using data associated with classified entities or a known set and unclassified entities or an unknown set. The use of data associated with classified and unclassified entities allows webpage data to be gathered for training a model based on the webpage data for both classified and unclassified entities. For example, a classification of a device in the known set may be used as a label when training the model with data associated with a device.

In various embodiments, blocks 412-428 may be performed using data associated with classified entities or a known set and unclassified entities or an unknown set. The use of classified and unclassified entities allows webpage data to be gathered for training a model based on the webpage data for both classified and unclassified entities.

At block 426, the model is evaluated. The model may be evaluated based on accuracy and coverage for classifications based on live or production environment data (e.g., not included in the training data). Coverage refers to the model being able to classify entities over a variety of types of entities or classifications for which the model has been trained.

The training of a model using the more available or more common properties from the unknown set(s), as described herein, enables reduced bias of the model and better results for classifying unknowns. The evaluation performed as part of block 426 may evaluate the trained model based on one or more unknown entities. The unknown entities may be entities that were labeled as unknown during training of the model but the actual label of the unknown entity is used to evaluate a classification result determined using the model. The unknown entities may thus be used to evaluate the model and calibrate the model further using the blocks of flowchart 400.

At block 428, whether the model meets parameters is determined. The parameters may be selected by a user (e.g., a researcher or a user) and be standards (e.g., accuracy and coverage) for a model to be deployed (e.g., used in production environments). If the trained model meets parameters, block 430 may be performed. If the trained model does not meet parameters, block 420 or 422 may be performed. For example, if the model is 80% accurate but 90% accuracy is the evaluation parameter, the blocks 420 or 422 may be performed with further tuning of featurization, keyword lists used, other machine learning model parameters (e.g., hyperparameters, for instance, inputs, weights, etc.), or combination thereof. The featurization and model parameters may be tuned independently and different data, different features, different keyword lists or portions thereof, different parameters, or a combination thereof may be to train the model (e.g., block 424).

At block 430, the model is stored. The model may be stored for later usage (e.g., by blocks of flowchart 500) and deployment (e.g., block 432). The model may be stored locally by an entity, may be stored in a cloud resource (e.g., cloud based storage, for instance, cloud model data store 266), or combination thereof for performing a classification using the model (e.g., performing the blocks of flowchart 500).

At block 432, the model is deployed. The model may be deployed to a cloud resource, one or more other entities (e.g., a network monitor entity, for instance, network monitor device 102, network monitor device 280), or a combination thereof for performing classification (e.g., based on external data).

The use of external data to train the model enable the model to classify an entity having properties or characteristics that have not been previously seen. For example, a model trained by blocks of flowchart 400 may thus have been trained with a variety of webpages including camera company websites. When a new camera entity is encountered, the properties of that new camera may be used to perform one or more web searches. The results of the web searches (e.g., keyword counts based on extracting the text from the webpage) may be input into a model, which may then infer, predict, or determine that the new entity is a camera. For example, the camera may be from a new camera vendor and based on embodiments accessing the vendor's website may determine that the vendor makes cameras.

FIG. 5 depicts a flow diagram of aspects of a method for determining a classification using a model in accordance with one implementation of the present disclosure. Various portions of flowchart 500 may be performed by different components (e.g., components of system 900) of an entity (e.g., network monitor device 102 or network monitor device 280). Flowchart 500 depicts a process for gathering information about an entity from one or more webpages to be used information with one or more models to classify the entity. The classification by blocks of flowchart 500 may be done using a model trained based on the blocks of flowchart 400. The process depicted by the flowchart 500 may be performed locally (e.g., by network monitor device 280) or in the cloud (e.g., by classification system 262) or a combination thereof.

The process depicted by flowchart 500 may be considered an "online" method or dynamic method of using the external or Internet data to classify an entity. In some embodiments, blocks of flowchart 500 may dynamically classify an entity based on an entity having one or more new properties that have been previously unencountered. For example, if a new entity is made by a new company, a vendor property may be new or unknown with respect to a classification model or classification system (e.g., based on profiles or fingerprints). Embodiments may use the vendor property to access one or more webpage associated with vendor to determine a classification of the entity, as described herein.

At block 502, network traffic is accessed. The traffic may be accessed by a network monitoring entity (e.g., network monitoring devices 102 or 280) via a port mirroring or SPAN port or via another method, as described herein. The traffic data may include one or more properties and property values for each entity communicatively coupled to one or more networks. The one or more properties may be extracted from the traffic data. The traffic may include active scanning properties (e.g., if active scanning is enabled).

In some embodiments, data (e.g., include properties and property values) is further accessed from third party systems (e.g., system 150, an external system, etc.) and used along with traffic data. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 504, one or more properties associated with each entity of the network are determined. The properties and associated values may be accessed from network traffic and be for entities (e.g., devices 220-222) communicatively coupled to a local network to an entity performing block 504. The properties can include data or values extracted from network traffic (e.g., packets) associated with each entity. For example, one or more properties and property values may be extracted or accessed based on one or more keywords or variables associated with portions of a packet, protocol fields, information from Nmap, information from p0f, data from active scans (e.g., probing or sending requests to an entity), etc. Each property may be stored as a property key (e.g., property name) and value (e.g., data of the property) pair. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows' version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network without involvement of an agent (e.g., software for collecting the properties running on the entity sending the packets).

The properties may further include identification information (e.g., serial number, etc.), device categorization, user categorization, location, compliance, risk, or a combination thereof which may be based on fingerprints, signatures, entity behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 500.

At block 506, a data store is accessed. The data store may be a local or cloud resource (e.g., cloud entity data store 268) with information of various entities (e.g., properties and associated values). The data store may include entity data (e.g., properties and property values) from one or more network monitoring entities (e.g., network monitor devices 102 and 280) that have been uploaded data. The data store may be organized or configured for use in training or classifying entities.

At block 508, the entity is classified. The entity may be classified using a model (e.g., ML model) based classification, profile based classification, fingerprint based classification, etc., or a combination thereof. The entity may be classified based on the properties and property values associated with the entity. If the entity cannot be classified (e.g., with a confidence above a threshold), the classification result will be unclassified.

In some embodiments, block 508 may be performed as part of the classifying each entity such that classified entities will be in a known set and unclassified entities will be in an unknown set. The known and unknown sets may then be used to train a model.

At block 510, whether the entity is unclassified is determined. If the entity is unclassified, block 512 may be performed. If the entity is classified, block 502 may be performed.

At block 512, properties associated with the entity are selected. The properties and associated values may be selected to be a seed set (e.g., data 302) which will be used to query or search for webpages, as described herein. The properties may include NIC vendor, DHCP properties, user agent, Nmap, open ports, etc.

At block 514, one or more heuristics are accessed. The heuristics are words, terms, or combinations thereof selected to help define the product that a vendor makes or what a vendor is doing (e.g., manufacturing, making, providing services, etc.). Heuristics may thus be used to enable more precise search results for products by the vendor, information about the vendor, or a product list of the vendor. The heuristics may thus add context to the data to enable more relevant search results. The heuristics may include "about," "products, etc.

At block 516, one or more searches, e.g., via search engines, using one or more heuristics are performed. For example, for a vendor of "axis cameras," example search terms may include "axis cameras", "about access cameras", and "axis camera products". A search may be performed for any property value. For example, DHCP values, user agent strings, etc., can be searched with a search engine (e.g., via a web crawler).

At block 518, the data from the searches is processed. The processing may include removing code (e.g., HTML code, JavaScript, etc.) and other non-text content (e.g., images). The processing may thus extract the text from the webpages. In some embodiments, text may be determined from images (e.g., via optical character recognition (OCR) or other image processing methods) and used along with text from the webpages.

At block 520, one or more keyword lists are accessed. The keyword lists may be lists of terms associated with one or more classifications or suggested classifications. The keywords may be manually defined buckets or categories (e.g., IT or OT categories) based on domain knowledge, existing classification taxonomy structure or a combination thereof. The keywords may be used to encode domain knowledge into a numeric form consumable by a ML model. Embodiments may count the presence or number of occurrences of keywords (e.g., a count for a keyword may be zero or greater) in the external information gathered, as described herein. It is appreciated the keyword lists may be used with machine learning and may not be needed with deep learning, NLU, or other methods. For example, deep learning and NLU may be used to determine the keywords of a webpage.

At block 522, properties and associated data are featurized. The properties, property values, keyword counts, keywords matched, or some combination thereof may be featurized. Featurization is the process of encoding information into numerical form for use with one or more models. For example, the featurization may include converting one or more values associated with a property (of an entity) into a numerical form, e.g., a vector or a matrix, that can be processed by a machine learning trained model or used for training a model. A keyword count may be stored in a portion of the vector. The information in numerical form can then be used to train a machine learning model to be able to infer or determine a classification. A feature may be a set of distinguishing characteristics for each class of an entity. For example, a feature may be a set of particular properties associated with a particular class of entities. In some embodiments, the featurization may be based on keyword counts, a hash table, etc.

In various embodiments, the properties and associated data (e.g., property values, keyword counts, keywords matched, etc.) may be featurized using n-grams (e.g., representing multiple words or sequences of letters), for instance, 2-grams, 4-grams, etc., or term frequency-inverse document frequency (tf-idf) scores.

At block 524, a classification result is determined. The classification result may be an inference determined based on the model and the data (e.g., from one or more webpages) associated with an entity. The classification may be a classification of the entity as an IT or OT entity, an entity type (e.g., healthcare, surveillance, etc.), an operating system associated with the entity, a function associated with the entity (e.g., switch, router, server, laptop, IP camera, printer, etc.). The classification result may be a list of numbers (e.g., associated with a profile) representing one or more confidence values. This list of numbers may be list of probabilities (e.g., associated with classifications). For example, for a model trained to classify an entity as an IT entity or an OT entity, the output may be [0.9, 0.1] representing a 90% chance the entity is an IT entity. The output may be [0.1, 0.9] representing a 90% change the entity is an OT device. The confidence value is associated with the computed accuracy or probability of the classification result.

In some embodiments, the classification result may be determined based on multiple models and other methods (e.g., profile based classification, fingerprints based classification, etc.). For example, the classification result may be based on a model trained, as described herein, a cloud based model, one or more models trained with selected data at various granularities, or a combination thereof. Each model may be trained as described with respect to FIG. 4. The classification results of may be combined or ensembled based on a variety of methods including an average, voting, etc. Embodiments may support standard ensemble methodologies.

In some embodiments, multiple confidence values for a particular classification result from multiple models may be averaged to determine a combined confidence. For example, if a cloud model classification result has a 75% confidence and an Internet data based classification result has a 90% confidence, the combined result will be 82.5%.

At block 526, the classification result is stored. The classification result may be output and may be displayed as part of a user interface (e.g., GUI). The classification result may further be used to apply one or more policies, rules, or other security procedures or actions to the entity. In some embodiments, the confidence associated with the classification result may be output and stored, etc.

At block 528, whether there are other unclassified entities is determined. If there are other unclassified entities, block 512 may be performed (e.g., and one or more properties for another unclassified entity used to determine a classification for the entity based on blocks 512-526). If there are other unclassified entities, block 502 may be performed.

FIG. 6 depicts a flow diagram of aspects of a method for determining a classification using a data store in accordance with one implementation of the present disclosure. Various portions of flowchart 600 may be performed by different components (e.g., components of system 900) of an entity (e.g., network monitor device 102 or network monitor device 280). Flowchart 600 depicts a process for using previously gathered data from one or more webpages to classify an entity based on one or more property values associated with the entity. In some embodiments, the previously gathered data is a based on various Internet search queries (e.g., with results preloaded) in a data store (e.g., database). The blocks of flowchart 600 thus allow a classification of an entity based on using data from the Internet (e.g., pre-gathered data from webpages, as described herein) without the need for communication with the Internet. Embodiments may thereby have improved classification while being used in environments without Internet access.

At block 602, network traffic is accessed. The traffic may be accessed by a network monitoring entity (e.g., network monitoring devices 102 or 280) via a port mirroring or SPAN port or via another method, as described herein. The traffic data may include one or more properties and property values for each entity communicatively coupled to one or more networks. The one or more properties and property values may be extracted from the traffic data. The traffic may include active scanning properties (e.g., if active scanning is enabled).

In some embodiments, data (e.g., including properties and property values) is further accessed from third party systems (e.g., system 150, an external system, etc.) and used along with traffic data. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 604, one or more properties associated with each entity of the network are determined. The properties can include data or values extracted from network traffic (e.g., packets) associated with each entity. For example, one or more properties and property values may be extracted or accessed based on one or more keywords or variables associated with portions of a packet, protocol fields, information from Nmap, information from p0f, data from active scans (e.g., probing or sending requests to an entity), etc. Each property may be stored as a property key (e.g., property name) and value (e.g., data of the property) pair. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) SynAck fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network agentlessly or without involvement of an agent (e.g., software for collecting the properties running on the entity sending the packets).

The properties may further include identification information (e.g., serial number, etc.), device categorization, user categorization, location, compliance, risk, or a combination thereof which may be based on fingerprints, signatures, entity behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 600.

At block 606, a data store is accessed. The data store may be a local or cloud resource (e.g., cloud entity data store 268) with information of various entities (e.g., properties and associated values). The data store may include entity data (e.g., properties and property values) from one or more network monitoring entities (e.g., network monitor devices 102 and 280) that have been uploaded data. The data store may be organized or configured for use in training or classifying entities.

At block 608, the entity is classified. The entity may be classified using a model (e.g., ML model) based classification, profile based classification, fingerprint based classification, etc., or a combination thereof. The entity may be classified based on the properties and property values associated with the entity. If the entity cannot be classified (e.g., with a confidence above a threshold), the classification result will be unclassified.

In some embodiments, block 608 may be performed as part of the classifying each entity such that classified entities will be in a known set and unclassified entities will be in an unknown set. The known and unknown sets may then be used to train a model.

At block 610, whether the entity is unclassified is determined. If the entity is unclassified, block 612 may be performed. If the entity is classified, block 602 may be performed.

At block 612, properties associated with the entity are selected. The properties and associated values may be selected to be a seed set (e.g., data 302) which will be used to query or search for webpages, as described herein. The properties may include NIC vendor, DHCP properties, user agent, Nmap, open ports, etc.

At block 614, a data store (e.g., database) of web results is accessed. The data store may include data from various web searches for a variety of entities (e.g., entities of different types, different functions, different operating systems, different operating system versions, different operating system patch or service levels) using heuristics, keyword word lists, processing the data from the web searches, and optionally featurization, as described herein. The data of the data store may be determined in a manner substantially similar to blocks 412-422 and 512-522. The data store (e.g., database) may have data for both classified and unclassified entities or devices.

For example, for an entity that is classified, select property information may be combined with heuristics to perform one or more web searches, as described herein. The results of the searches (e.g., top webpage result of the searches) can be processed to extract text and the extracted text can then be used with a keyword list to determine one or more keyword list counts. The keyword list count may then be featurized along with a label of the entity classification and stored in the data store.

At block 616, a classification result is determined. The classification result may be an inference determined based on the data store of web results and the data (e.g., property values) associated with an entity. For example, the properties associated the entity are matched with a row of the data store of web results and the classification associated with that row is inferred or determined to be the classification of the entity. The classification may be inferred or determined based on a match or partial match of one or more property values to a portion (e.g., row) of the data store. The classification may be a classification of the entity as an IT or OT entity, an entity type, an operating system associated with the entity, a function associated with the entity, etc.

In some embodiments, the classification result may have an associated confidence value. The confidence value is associated with the computed accuracy or probability of the classification result. The confidence value associated with the classification may be compared with a threshold (e.g., confidence threshold) to determine whether the classification will be used (e.g., a basis for an action, as a basis for whether further classification will be performed, etc.) or other operations will be performed (e.g., classification using another method).

In some embodiments, the classification result may be determined based on multiple models and other methods (e.g., profile based classification, fingerprints based classification, etc.) in addition to the data store of web results. For example, the classification result may be based on a data store of web results, as described herein, and a profile based classification, or a combination thereof. The classification results of may be combined or ensembled based on a variety of methods including an average, voting, etc. Embodiments may support standard ensemble methodologies.

In some embodiments, multiple confidence values for a particular classification result from multiple methods may be averaged to determine a combined confidence. For example, if a web results data store classification result has a 75% confidence and a profile based classification result has a 90% confidence, the combined result will be 82.5%.

At block 618, the classification result is stored. The classification result may be output and may be displayed as part of a user interface (e.g., GUI). The classification result may further be used to apply one or more policies, rules, or other security procedures or actions to the entity. In some embodiments, the confidence associated with the classification result may be output and stored, etc.

At block 620, whether there are other unclassified entities is determined. If there are other unclassified entities, block 612 may be performed (e.g., and one or more properties for another unclassified entity used to determine a classification for the entity based on blocks 612-618). If there are other unclassified entities, block 602 may be performed.

Figure 7A:
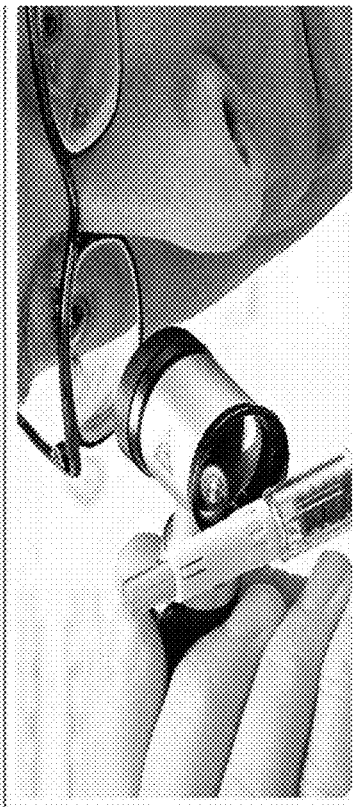
FIG. 7A depicts example aspects of a webpage in accordance with one implementation of the present disclosure.

FIG. 7A depicts example aspects of a webpage in accordance with one implementation of the present disclosure. Diagram 700 includes a NIC vendor property with a value of "yposmed ag" which may have been determined based on a MAC address of an entity (e.g., OUI portion of the MAC address). The NIC vendor value may be used to search the Internet, as described herein, and webpage result is shown in FIG. 7A as the webpage of Ypsomed Ag (e.g., http://www.ypsomed.com).

FIG. 7B depicts example aspects of data extracted from the webpage in accordance with one implementation of the present disclosure. FIG. 7B includes example text 750 extracted from the webpage result after searching for "ypsomed ag." The example text 750 includes the content of the webpage based on the search for "ypsomed ag" with code or non-content portions (e.g., HTML code, JavaScript code, etc.) removed.

Example text 750 can then be matched with keywords from a keyword list. Example keywords in the example text 750 that match keywords in a keyword list include injection, diabetes, medication, pharmaceutical, treatment, infusion system, blood, glucose, biotechnology. The presence of a large number of such healthcare specific keywords on the page enable a model to be trained that this vendor likely makes healthcare equipment. The trained model can then classify an entity with a NIC vendor property of yposmed ag as an OT entity, healthcare entity, etc.

Figure 8A:
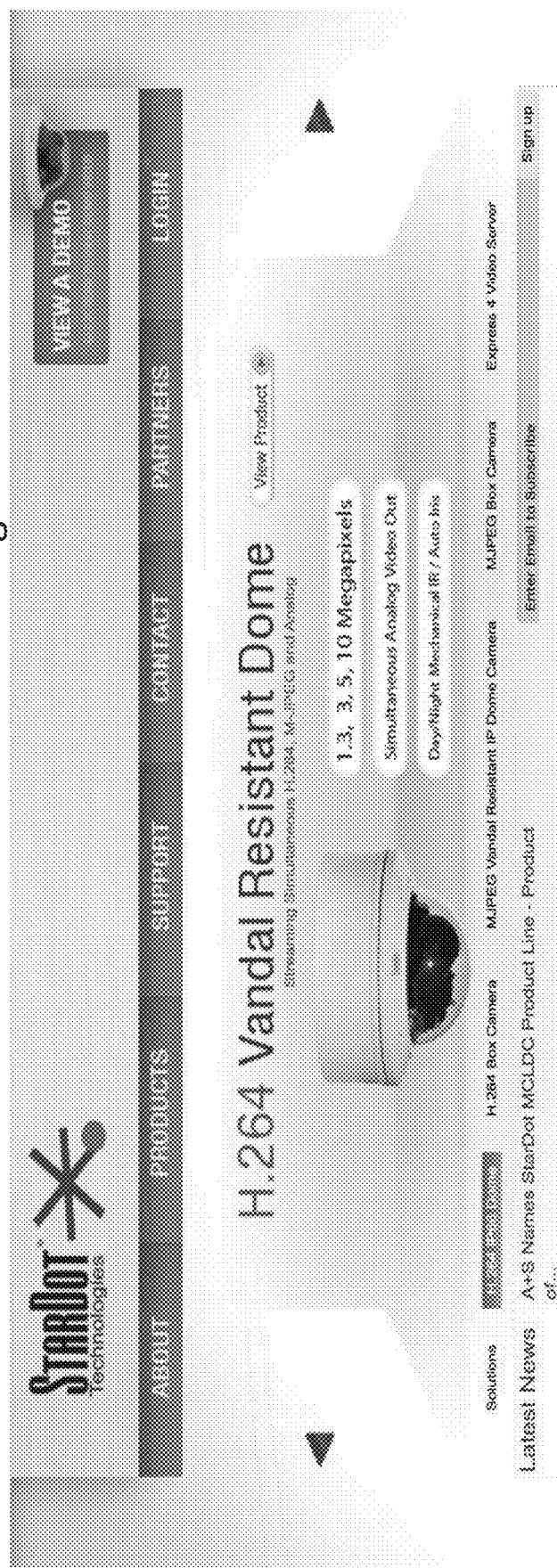
FIG. 8A depicts example aspects of another webpage in accordance with one implementation of the present disclosure.

FIG. 8A depicts example aspects of another webpage in accordance with one implementation of the present disclosure. Diagram 800 includes a NIC vendor property with a value of "stardot technologies" which may have been determined based on a MAC address of an entity (e.g., OUI portion of the MAC address). The NIC vendor value may be used to search the Internet, as described herein, and webpage result is shown in FIG. 8A as the webpage of Stardot Technologies (e.g., http://www.stardot.com).

FIG. 8B depicts example aspects of data extracted from the additional webpage in accordance with one implementation of the present disclosure. FIG. 8B includes example text 850 extracted from the webpage result after searching for "stardot technologies." The example text 850 includes the content of the webpage based on the search for "stardot technologies" with code or non-content portions (e.g., HTML code, JavaScript code, etc.) removed.

Example text 850 can then be matched with keywords from a keyword list. Example keywords in the example text 850 that match keywords in a keyword list include IP camera, network camera, dome camera, box camera, camera, megapixel, lens, analog video, and professional security. The keywords indicate that this vendor likely makes surveillance equipment like IP cameras. These keywords enable a model to be trained that this vendor likely makes surveillance equipment. The trained model can then classify an entity with a NIC vendor property of stardot technologies as an OT entity, surveillance entity, etc.

Figure 9:
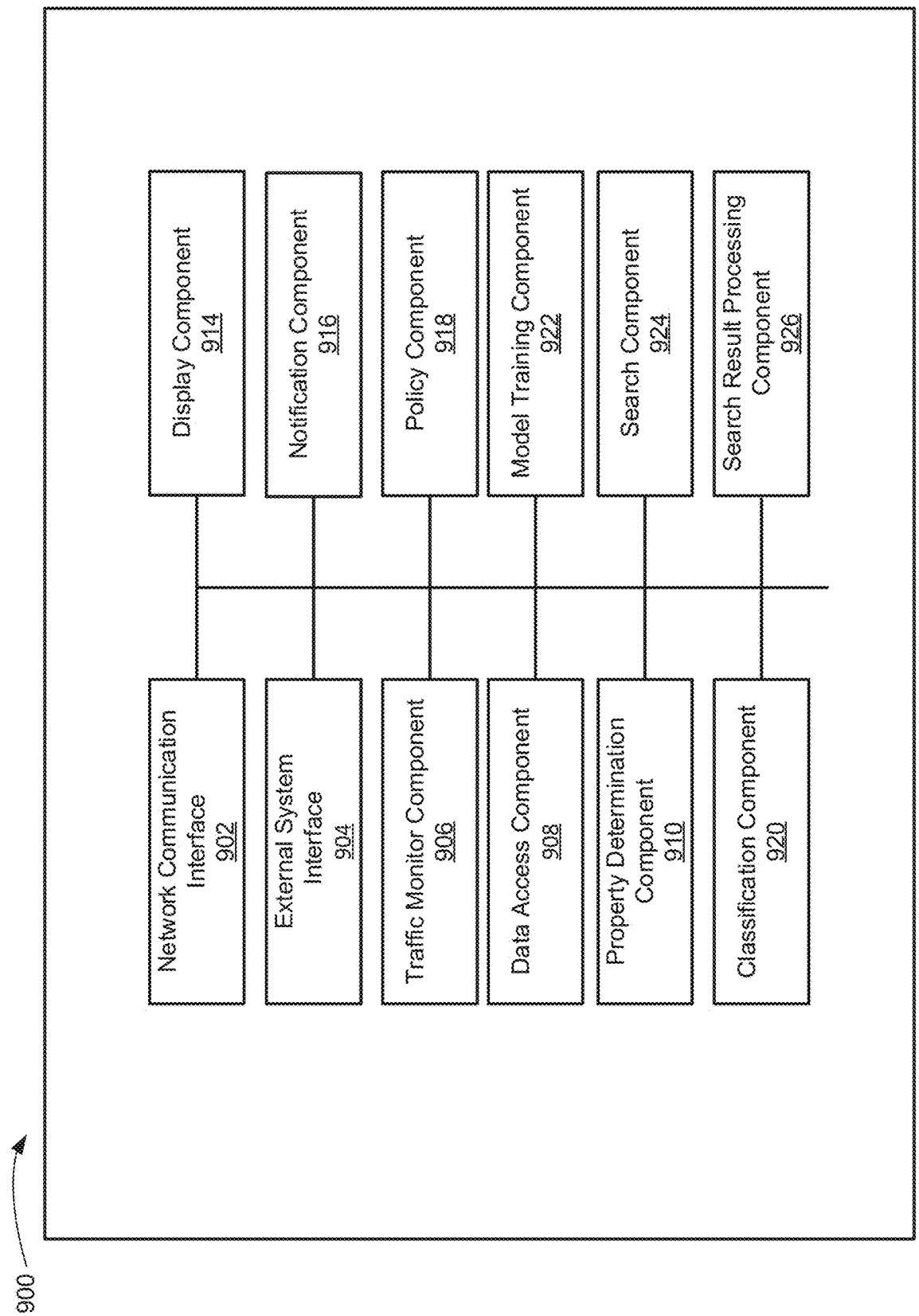
FIG. 9 depicts illustrative components of a system for classifying entities, training models, or a combination thereof in accordance with one implementation of the present disclosure.

FIG. 9 illustrates example components used by various embodiments. Although specific components are disclosed in system 900, it should be appreciated that such components are examples. That is, embodiments are well suited to having various other components or variations of the components recited in system 900. It is appreciated that the components in system 900 may operate with other components than those presented, and that not all of the components of system 900 may be required to achieve the goals of system 900.

FIG. 9 depicts illustrative components of a system for classifying entities, training models, or a combination thereof in accordance with one implementation of the present disclosure. Example system 900 or classifier 900 includes a network communication interface 902, an external system interface 904, a traffic monitor component 906, a data access component 908, a property determination component 910, a display component 914, a notification component 916, a policy component 918, a classification component 920, a model training component 922, a search component 924, and a search result processing component 926. The components of system 900 may be part of a computing system or other electronic device (e.g., network monitor device 102 or network monitor device 280) or a virtual machine or device and be operable to monitor and one or more entities communicatively coupled to a network, monitor network traffic, determine one or more classifications of an entity, perform one or more actions, as described herein. For example, the system 900 may further include a memory and a processing device, operatively coupled to the memory, which may perform the operations of or execute the components of system 900. The components of system 900 may access various data and characteristics or properties associated with an entity (e.g., network communication information) and data associated with one or more entities. It is appreciated that the modular nature of system 900 may allow the components to be independent and allow flexibility to enable or disable individual components or to extend, upgrade, or combination thereof components without affecting other components thereby providing scalability and extensibility. System 900 may perform one or more blocks of flow diagrams 400-500. In some embodiments the components of 900 may be part of network monitor entity (e.g., network monitor devices 102 and 280), in the cloud, or the various components may be distributed between local and cloud resources.

Communication interface 902 is operable to communicate with one or more entities (e.g., network device 104, firewall 206, switch 210, other devices coupled thereto, devices 220-222, etc.) coupled to a network that are coupled to system 900 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 902 may be operable to work with one or more components to initiate access to characteristics or determination of characteristics of an entity to allow determination of one or more properties which may then be used for device compliance, asset management, standards compliance, classification, identification, etc., as described herein. Communication interface 902 may be used to receive and store network traffic for determining properties, as described herein.

External system interface 904 is operable to communicate with one or more third party, remote, or external systems to access information including characteristics or properties about an entity (e.g., to be used to determine a security aspects). External system interface 904 may further store the accessed information in a data store. For example, external system interface 904 may access information from a vulnerability assessment (VA) system to enable determination of one or more compliance or risk characteristics associated with the entity. External system interface 904 may be operable to communicate with a vulnerability assessment (VA) system, an advanced threat detection (ATD) system, a mobile device management (MDM) system, a firewall (FW) system, a switch system, an access point (AP) system, etc.

External system interface 904 may query a third party system using an API or CLI. For example, external system interface 904 may query a firewall or a switch for information (e.g., network session information) about an entity or for a list of entities that are communicatively coupled to the firewall or switch and communications associated therewith. In some embodiments, external system interface 904 may query a switch, a firewall, or other system for information of communications associated with an entity.

Traffic monitor component 906 is operable to monitor network traffic to determine if a new entity has joined the network or an entity has rejoined the network and monitor traffic for analysis by data access component 908, classification component 920, and model training component 922, as described herein. Traffic monitor component 906 may have a packet engine operable to access packets of network traffic (e.g., passively) and analyze the network traffic. The traffic monitor component 906 may further be able to access and analyze traffic logs from one or more entities (e.g., network device 104, system 150, or aggregation device 106) or from an entity being monitored. The traffic monitor component 906 may further be able to access traffic analysis data associated with an entity being monitored, e.g., where the traffic analysis is performed by a third party system.

Data access component 908 may be operable for accessing data including metadata associated with one or more network monitoring entities (e.g., network monitor devices 102 or 280-282), including properties that the network monitoring entity is monitoring or collecting, software versions (e.g., of the profile library of the network monitoring entity), and the internal configuration of the network monitoring entity. The data accessed by data access component 908 may be used by embodiments to perform classification including ensuring that the most up to date models, profiles, and other classification information is being used (e.g., by classification component 920). Data access component 908 may further access vertical or environment data and other user associated data, including vertical, environment, common type of devices for the network or network portions, segments, areas with classification issues, etc., which may be used for classification.

Data access component 908 may access data associated with active or passive traffic analysis or scans or a combination thereof. Data access component may further be able to access and analyze traffic logs from one or more entities (e.g., network device 104, system 150, or aggregation device 106) or from an entity being monitored. Data access component 908 may further be able to access traffic analysis data associated with an entity being monitored, e.g., where the traffic analysis is performed by a third party system. Information accessed by data access component 908 may be stored, displayed, and used as a basis for classification (e.g., blocks of flowcharts 500-600), model training (e.g., blocks of flowchart 400), model evaluation, etc., as described herein.

Property determination component 910 is configured to determine one or more properties associated with an entity, as described herein. Property determination component 910 may determine one or more properties and associated values associated with an entity based on analysis (e.g., including extraction of properties and values) of network traffic, as described herein. The properties can then be stored and used by other components (e.g., classification component 920, model training component 922, search component 924, etc.) for performing classification, training one or more models, evaluating one or more models, and performing actions (e.g., security actions), as described herein.

Classification component 920 is configured to determine one or more classifications or classification results, e.g., based on one or more searches using property values, as described herein. The classification result may be based on keyword lists, keyword counts, or a combination thereof (e.g., as described with respect to FIG. 5). The classification result may be determined using featurized data based on the results of one or more search queries and data extracted from one or more webpages associated with the search queries. Classification component 920 is further configured to determine a confidence associated with a classification (result), as described herein, which may then be compared with a confidence threshold, as described herein.

In some embodiments, the classification may be based on a local data store (e.g., database) that includes classification labels and associated data from one or more webpages, as described herein. Classification component 920 may thus determine a classification result using locally stored data (e.g., as described with respect to FIG. 6).

Classification component 920 may further use profile libraries, entity or device fingerprints, etc., in conjunction or in place of classification using the one or more models, as described herein. Classification component 920 may use local resources (e.g., local classification engine 240), cloud resources (e.g., classification system 262), or a combination thereof for determining a classification result.

Model training component 922 is configured to train one or more models using external data (e.g., blocks of flowchart 400), as described herein. The models trained by model training component 922 may be used by classification component 920 to classify an entity using external data, as described herein. In some embodiments, model training component 922 is configured to featurize data (e.g., block 422), train one or more models (e.g., block 424), and evaluate a model (e.g., blocks 426-428). Model training component 922 may be further configured to store a trained model (e.g., block 430), deploy a model (e.g., block 432), or a combination thereof.

Search component 924 is configured to determine and perform one or more search queries, as described herein. The search queries may be based on selected properties and property values associated with an entity, one or more heuristics, or a combination thereof, as described herein. Search component 924 may issues the search queries to one or more search engine websites (e.g., Google™), receive the results, and access webpages associated with the search results, as described herein.

Search result processing component 926 is configured to process data from the one or more search results, as described herein. The processing of the search results may include extracting text from one or more webpages (e.g., by removing code, for instance, HTML and JavaScript code), accessing one or more keyword lists, and matching words from the keyword lists to the words of the text from the one or more webpages. Search result processing component 926 may further determine keyword counts which are counts for each word from the keyword lists that matches or does not match words of the text from the one or more webpages. The keyword counts may then be used to train a model (e.g., by model training component 922) or determine a classification (e.g., by classification component 920). In some embodiments, the results of processing the search results may be stored in a data store (e.g., database) and used for classification (e.g., as described with respect to FIG. 6).

Display component 914 is configured to optionally display one or more graphical user interfaces or other interfaces (e.g., command line interface) for depicting various information associated with entities, classification, thresholds (e.g., confidence thresholds), and models, as described herein. In some embodiments, display component 914 may display or render a network graph of entities including one or more classifications, access rules associated with entities, and other access rule information (e.g., access policies, access templates, etc.).

Notification component 916 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 918 is operable for initiating or triggering one or more remediation actions or security actions according to one or more policies, e.g., based on one or more classifications, as described herein. Policy component 918 may further be configured to perform other operations including checking compliance status, finding open ports, etc. In some embodiments, policy component 918 may verify that an assignment of one or more access rules to one or more enforcements points has been properly assigned or configured. Policy component 918 may restrict network access, signal a patch system or service, signal an update system or service, etc., as described herein. The policy component 918 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 600 may be software stored on a non-transitory computer readable medium having instructions encoded thereon that, when executed by a processing device, cause the processing device to access network traffic from a network. The network traffic may be associated with a plurality of entities. The instructions may further cause the processing device to select an entity and determine one or more values associated with one or more properties associated with the entity. The one or more values are accessed from the network traffic. The instructions may further cause the processing device to determine a search query based on the one or more values associated with the one or more properties associated with the entity and perform the search query. The instructions may further cause the processing device to receive a search query result. The search query result comprises a plurality of webpages. The instructions may further cause the processing device to access data from a webpage of the plurality webpages and determine, by the processing device, a classification result of the entity based on the data from the webpage of the plurality of webpages. The instructions may further cause the processing device to store the classification result.

In some embodiments, the instructions may further cause the processing device to perform an action based on the classification result. In various embodiments, the classification result is determined using a model trained based on data from a plurality of webpages. In some embodiments, the classification result is determined based on a database comprising data based on a plurality of webpages. In various embodiments, the search query is further determined based on at least one heuristic. In some embodiments, the instructions may further cause the processing device to extract text from the webpage of the plurality of webpages. In various embodiments, the instructions may further cause the processing device to access a keyword list comprising a plurality of keywords. One or more keyword matches of the plurality of keywords and data from the webpage may be determined. The classification result is based on at least one keyword of the keyword list. In some embodiments, the instructions may further cause the processing device to determine a keyword count for each keyword matched from the keyword list and the data from the webpage. The classification result is based on at least one keyword count.

Figure 10:
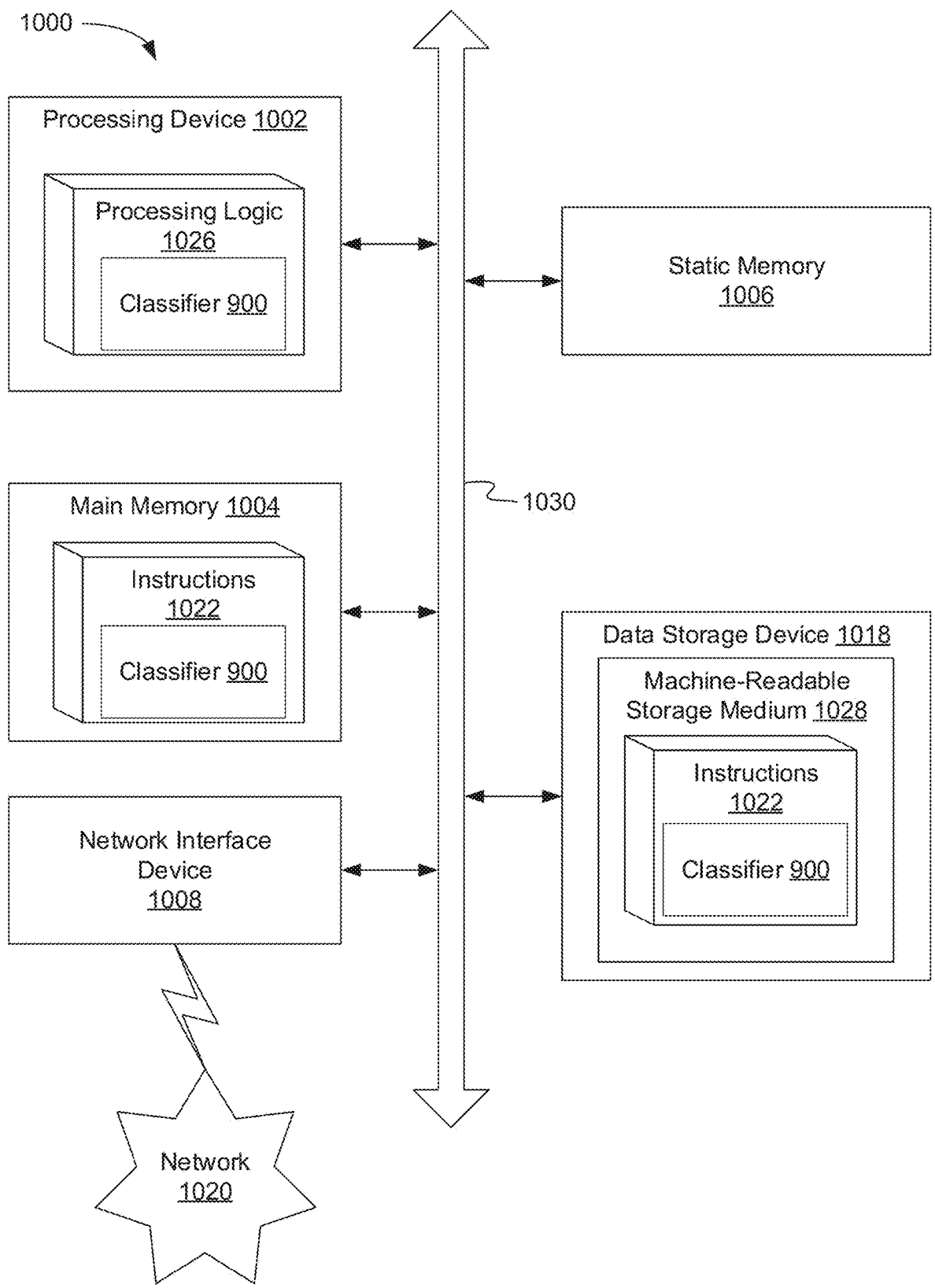
FIG. 10 is a block diagram illustrating an example computer system, in accordance with one implementation of the present disclosure.

FIG. 10 is a block diagram illustrating an example computer system, in accordance with one implementation of the present disclosure. FIG. 10 illustrates a diagrammatic representation of a machine in the example form of a computer system 10 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 10 may be representative of a server, such as network monitor device 102 running classifier 900 to perform classification using external data, as described herein. Classifier 900 may optionally train one or more models at various levels of granularity using external data, as described herein.

The exemplary computer system 1000 includes a processing device 1002, a main memory 1004 (e.g., read-only memory (ROM), flash memory, dynamic random access memory (DRAM), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026, which may be one example of classifier 900 shown in FIG. 9, for performing the operations and steps discussed herein.

The data storage device 1018 may include a machine-readable storage medium 1028, on which is stored one or more set of instructions 1022 (e.g., software) embodying any one or more of the methodologies of functions described herein, including instructions to cause the processing device 1002 to execute classifier 900. The instructions 1022 may also reside, completely or at least partially, within the main memory 1004 and/or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform a method for determining one or more classifications and training one or more models, as described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   accessing network traffic from a network, wherein the network traffic is associated with a plurality of entities;
   selecting an entity of the plurality of entities;
   determining one or more values associated with one or more properties associated with the entity, wherein the one or more values are accessed from the network traffic or other sources of device information;
   determining that the one or more properties are insufficient to classify the entity;
   in response to determining that the one or more properties are insufficient to classify the entity:
   applying one or more heuristics to the one or more properties associated with the entity to generate a search query based on the one or more values associated with the one or more properties associated with the entity, wherein the one or more heuristics comprise at least one of words or terms applied to the one or more properties to provide context to the one or more properties, and wherein the entity comprises a computing device coupled to the network;
performing the search query based on the one or more values previously determined;
receiving a search query result, wherein the search query result comprises a plurality of webpages associated with the entity;
accessing a keyword list comprising a plurality of keywords or terms associated with one or more entity classifications; and
accessing data from a webpage of the plurality of webpages, wherein the data comprises one or more additional values associated with one or more additional properties of the computing device, wherein the one or more additional values are identified based a comparison of the data from the webpage and the keyword list;
determining, by a processing device, a classification result of the entity based on the data from the webpage of the plurality of webpages and the one or more values associated with the one or more properties associated with the entity accessed from the network traffic; and
storing the classification result.

2. The method of claim 1 further comprising:
performing an action based on the classification result.

3. The method of claim 1, wherein the classification result is determined using a model trained based on data from the plurality of webpages.

4. The method of claim 1, wherein the classification result is determined based on a database comprising data based on the plurality of webpages.

5. The method of claim 1 further comprising:
extracting text from the webpage of the plurality of webpages.

6. The method of claim 1 further comprising:
determining one or more keyword matches of the plurality of keywords and data from the webpage, wherein the classification result is based on at least one keyword of the keyword list.

7. The method of claim 6 further comprising:
determining a keyword count for a keyword matched from the keyword list and the data from the webpage, wherein the classification result is based on the keyword count.

8. A system comprising:
a memory; and
a processing device, operatively coupled to the memory, to:
access network traffic from a network, wherein the network traffic is associated with a plurality of entities;
select an entity of the plurality of entities;
determine one or more values associated with one or more properties associated with the entity, wherein the one or more values are accessed from the network traffic or other sources of device information;
determine that the one or more properties are insufficient to classify the entity;
in response to determining that the one or more properties are insufficient to classify the entity:
apply one or more heuristics to the one or more properties associated with the entity to generate a search query based on the one or more values associated with the one or more properties associated with the entity, wherein the one or more heuristics comprise at least one of words or terms applied to the one or more properties to provide context to the one or more properties, and wherein the entity comprises a computing device coupled to the network;
perform the search query based on the one or more values previously determined;
receive a search query result, wherein the search query result comprises a plurality of webpages associated with the entity;
access a keyword list comprising a plurality of keywords or terms associated with one or more entity classifications; and
access data from a webpage of the plurality of webpages, wherein the data comprises one or more additional values associated with one or more additional properties of the computing device, wherein the one or more additional values are identified based a comparison of the data from the webpage and the keyword list;
determine, by the processing device, a classification result of the entity based on the data from the webpage of the plurality of webpages and the one or more values associated with the one or more properties associated with the entity accessed from the network traffic; and
store the classification result.

9. The system of claim 8, the processing device further to:
perform an action based on the classification result.

10. The system of claim 8, wherein the classification result is determined using a model trained based on data from the plurality of webpages.

11. The system of claim 8, wherein the classification result is determined based on a database comprising data based on the plurality of webpages.

12. The system of claim 8, the processing device further to:
extract text from the webpage of the plurality of webpages.

13. The system of claim 8, the processing device further to:
determine one or more keyword matches of the plurality of keywords and data from the webpage, wherein the classification result is based on at least one keyword of the keyword list.

14. The system of claim 13, the processing device further to:
determine a keyword count for each keyword matched from the keyword list and the data from the webpage, wherein the classification result is based on at least one keyword count.

15. A non-transitory computer readable medium having instructions encoded thereon that, when executed by a processing device, cause the processing device to:
access network traffic from a network, wherein the network traffic is associated with a plurality of entities;
select an entity of the plurality of entities;
determine one or more values associated with one or more properties associated with the entity, wherein the one or more values are accessed from the network traffic or other sources of device information;
determine that the one or more properties are insufficient to classify the entity;
in response to determining that the one or more properties are insufficient to classify the entity:
apply one or more heuristics to the one or more properties associated with the entity to generate a search query based on the one or more values associated with the one or more properties associated with the entity, wherein the one or more heuristics comprise at least one of words or terms applied to the one or more properties to provide context to the one or more properties, and wherein the entity comprises a computing device coupled to the network;

perform the search query based on the one or more values previously determined;

receive a search query result, wherein the search query result comprises a plurality of webpages associated with the entity;

access a keyword list comprising a plurality of keywords or terms associated with one or more entity classifications; and access data from a webpage of the plurality of webpages, wherein the data comprises one or more additional values associated with one or more additional properties of the computing device, wherein the one or more additional values are identified based a comparison of the data from the webpage and the keyword list;

determine, by the processing device, a classification result of the entity based on the data from the webpage of the plurality of webpages and the one or more values associated with the one or more properties associated with the entity accessed from the network traffic; and store the classification result.

16. The non-transitory computer readable medium of claim 15, wherein the instructions further cause the processing device to:

performing an action based on the classification result.

17. The non-transitory computer readable medium of claim 15, wherein the classification result is determined using a model trained based on data from the plurality of webpages.

18. The non-transitory computer readable medium of claim 15, wherein the classification result is determined based on a database comprising data based on the plurality of webpages.

\* \* \* \* \*